(12) United States Patent
Paniagua, Jr. et al.

(10) Patent No.: US 8,261,100 B2
(45) Date of Patent: *Sep. 4, 2012

(54) POWER ADAPTER CAPABLE OF COMMUNICATING DIGITALLY WITH ELECTRONIC DEVICES USING PACKET-BASED PROTOCOL

(75) Inventors: Frank Paniagua, Jr., San Ramon, CA (US); Parag Mody, Oakland, CA (US); Hossein Yassaie, Bucks (GB)

(73) Assignee: Green Plug, Inc., San Ramon, CA (US)

( * ) Notice: Subject to any disclaimer, the term of this patent is extended or adjusted under 35 U.S.C. 154(b) by 1115 days.

This patent is subject to a terminal disclaimer.

(21) Appl. No.: 11/969,163

(22) Filed: Jan. 3, 2008

(65) Prior Publication Data
US 2008/0222431 A1  Sep. 11, 2008

Related U.S. Application Data

(63) Continuation-in-part of application No. 11/513,687, filed on Aug. 30, 2006, now abandoned.

(51) Int. Cl.
*G06F 1/26* (2006.01)
(52) U.S. Cl. .......... 713/300; 320/114; 455/573
(58) Field of Classification Search ........... 320/114; 455/573; 713/300
See application file for complete search history.

(56) References Cited

U.S. PATENT DOCUMENTS

| | | | |
|---|---|---|---|
| 5,488,572 A | 1/1996 | Belmont | |
| 6,029,215 A | 2/2000 | Watts et al. | |
| 7,394,676 B2 * | 7/2008 | Patel | 363/142 |
| 7,531,986 B2 * | 5/2009 | Eager et al. | 320/116 |
| 7,646,107 B2 * | 1/2010 | Smith | 307/11 |
| 2006/0046653 A1 | 3/2006 | Kirbas | |
| 2006/0223579 A1 | 10/2006 | Whitaker et al. | |
| 2010/0264875 A1 * | 10/2010 | Hoffman et al. | 320/111 |

OTHER PUBLICATIONS

American Power Conversion, 90-Watt-Hour Universal Notebook Battery (UPB90) User's Manual, 2007.*
PCT International Search Report, PCT/US2009/30149.
PCT Written Opinion of the International Searching Authority, PCT/US2009/30149.

* cited by examiner

*Primary Examiner* — Albert Wang
(74) *Attorney, Agent, or Firm* — DLA Piper LLP; Andrew B. Schwaab; Blake W. Jackson

(57) ABSTRACT

A power adapter capable of communicating digitally with a device or a legacy adapter associated with a device is described. The power adapter includes an input port to receive power from a power source, a regulator to convert the received power from the power source, an output port configured to deliver power from the regulator to a device, and a microprocessor configured to communicate digitally with a communication module associated with the device to determine the power requirements of the device. The regulator converts the power from the power source in accordance with the power requirements of the device. A related method of adapting power to a device is also described.

90 Claims, 13 Drawing Sheets

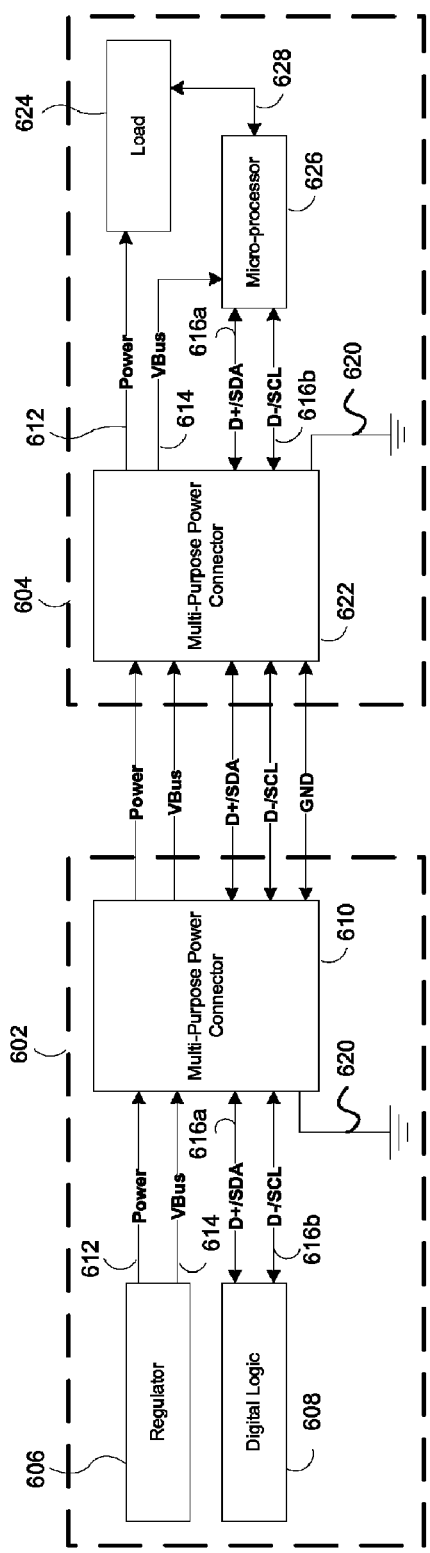
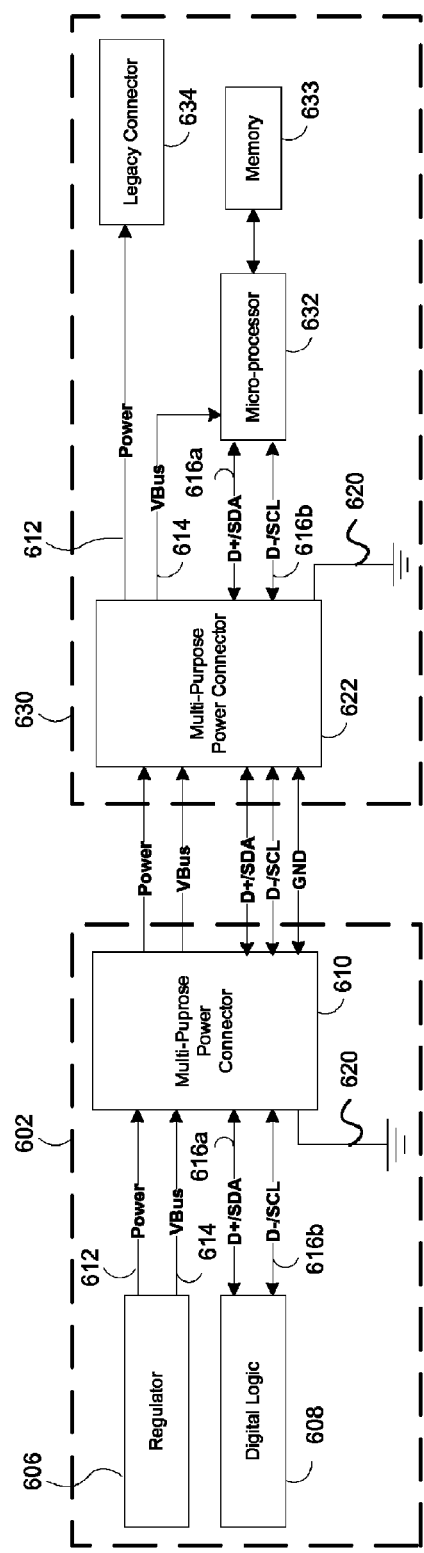
FIG. 6A
FIG. 6B

To FIG. 12B →

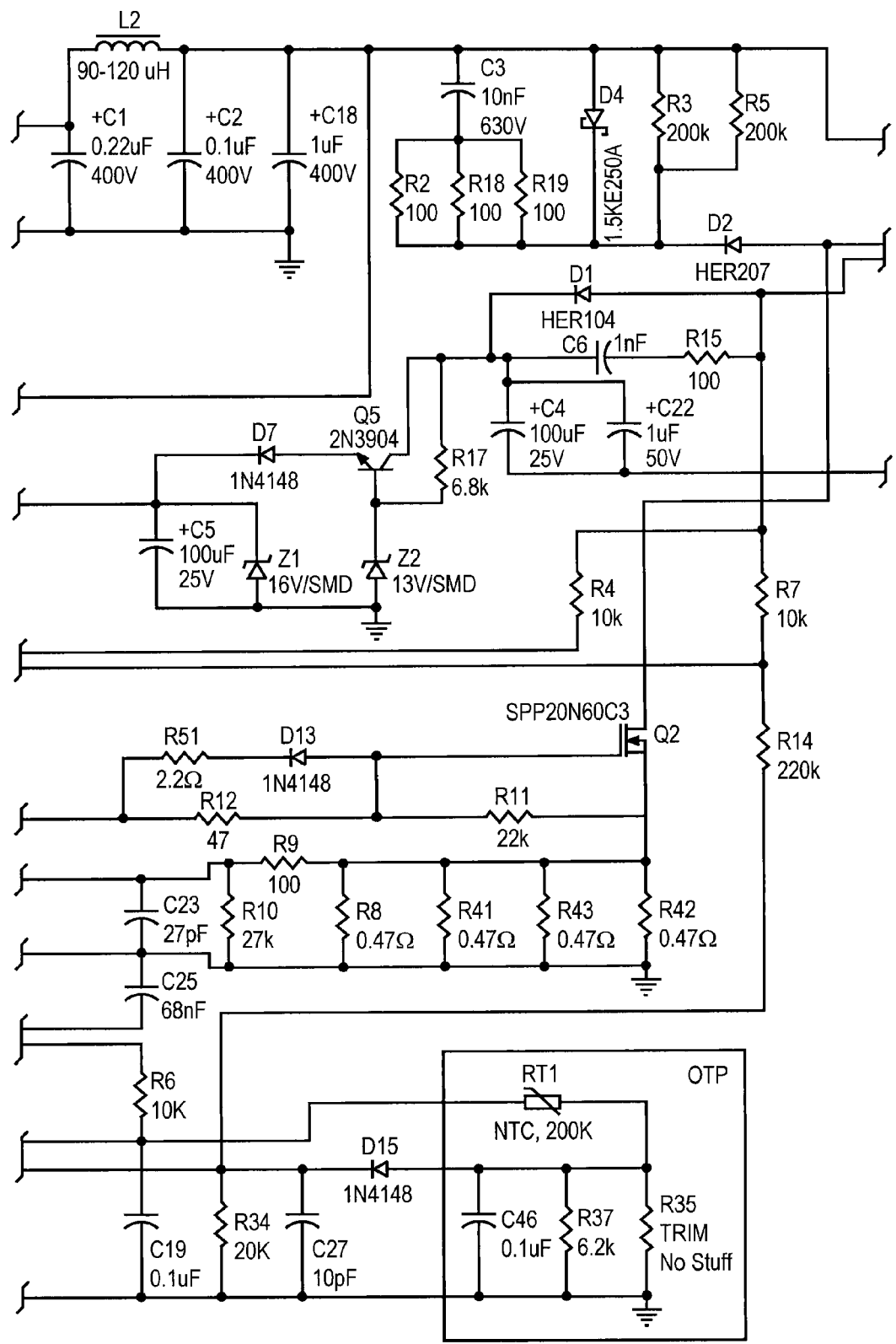
← From FIG. 12A  FIG. 12B  To FIG. 12C →

← From FIG. 12B

POWER ADAPTER CAPABLE OF COMMUNICATING DIGITALLY WITH ELECTRONIC DEVICES USING PACKET-BASED PROTOCOL

RELATED APPLICATIONS

This application claims priority to and is a continuation-in-part of U.S. patent application Ser. No. 11/513,687, now abandoned titled "Power Supply Capable of Receiving Digital Communications from Electronic Devices," filed Aug. 30, 2006, which is incorporated by referenced herein in its entirety.

TECHNICAL FIELD

The disclosed embodiments relate generally to power adapters, and more particularly, to a power adapter that is capable of communicating digitally with devices to be powered by the power adapter.

BACKGROUND

Consumer electronic devices are ubiquitous in the world we live in today. From laptop computers and personal digital assistants to multimedia players and mobile phones, people today own a wide variety of electronic devices. These electronic devices come with a wide variety of power supplies, sometimes referred to as "wall warts," "power bricks," or "power adapters." Unfortunately, these power supplies are often specific to the device type, device manufacturer, and/or device product line, and are therefore incompatible with each other. If a user loses a power supply for a device, the power supply of another device generally cannot be used as a substitute. This causes many problems. Travel is made more inconvenient by the prospect of having to bring multiple power supplies for various portable devices. A device may be damaged and/or its useful life shortened if the wrong power supply is used. Furthermore, as devices become obsolete and are discarded by users, the power supplies for the devices may be discarded as well because users often do not have other devices that are compatible with these power supplies.

Accordingly, what is needed is a power adapter that can communicate digitally with and be used to power a wide variety of devices.

SUMMARY

The above deficiencies and other problems associated with power supplies are reduced or eliminated by the disclosed power adapter and an electronic device that are capable of digital communications with each other.

According to some embodiments, a power adapter to provide power to a device includes an input port to receive power from a power source, a regulator to convert the received power from the power source, an output port configured to deliver power from the regulator to the device, and a microprocessor configured to communicate digitally with a communication module associated with the device to determine power requirements of the device. The regulator converts the power from the power source in accordance with the power requirements of the device.

According to some embodiments, a method of adapting power to a device includes receiving power from a power source at an input port, communicating digitally with a communication module associated with the device to determine power requirements of the device, converting the power from the power source in accordance with the power requirements of the device, and delivering the converted power to a device through an output port.

According to some embodiments, a power adapter includes an input port to receive power from a power source, one or more regulators to convert power from the power source, a plurality of output ports configured to deliver power from the one or more regulators to a plurality of devices, and a microprocessor configured to communicate digitally with a respective communication module associated with a respective device to determine power requirements of the respective device. One of the one or more regulators converts the power from the power source in accordance with the power requirements of the respective device.

According to some embodiments, a method of adapting power to a plurality of devices includes receiving power from a power source at an input port, communicating digitally with a communication module associated with a respective device of the plurality of devices to determine the power requirements of the respective device, converting power from the power source in accordance with the power requirements of the respective device, and delivering the converted power to the respective device through one of a plurality of output ports.

According to some embodiments, a communication module for use with an electrical device includes a microprocessor, housed in the electrical device, configured to communicate digitally with an external power adapter to communicate power requirements of the electrical device to the power adapter through a port of the electrical device, the power requirements including at least a voltage requirement and a current requirement.

According to some embodiments, a method of receiving power from an external power adapter external to an electrical device includes receiving an initial predefined voltage to facilitate communication between the external power adapter and the electrical device, communicating digitally with the external power adapter to communicate power requirements of the electrical device to the external power adapter through a power port of the electrical device, and receiving power supplied by the external power adapter based on the power requirements of the electrical device. The power requirements include a voltage requirement and a current requirement.

BRIEF DESCRIPTION OF THE DRAWINGS

FIGS. 6A-6C are schematics illustrating a power adapter coupled to a device, a legacy adapter, or a client in accordance with some embodiments.

FIGS. 12A-C are circuit schematics illustrating a PFC Controller in accordance with some embodiments.

Like reference numerals refer to corresponding parts throughout the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Figure 1:
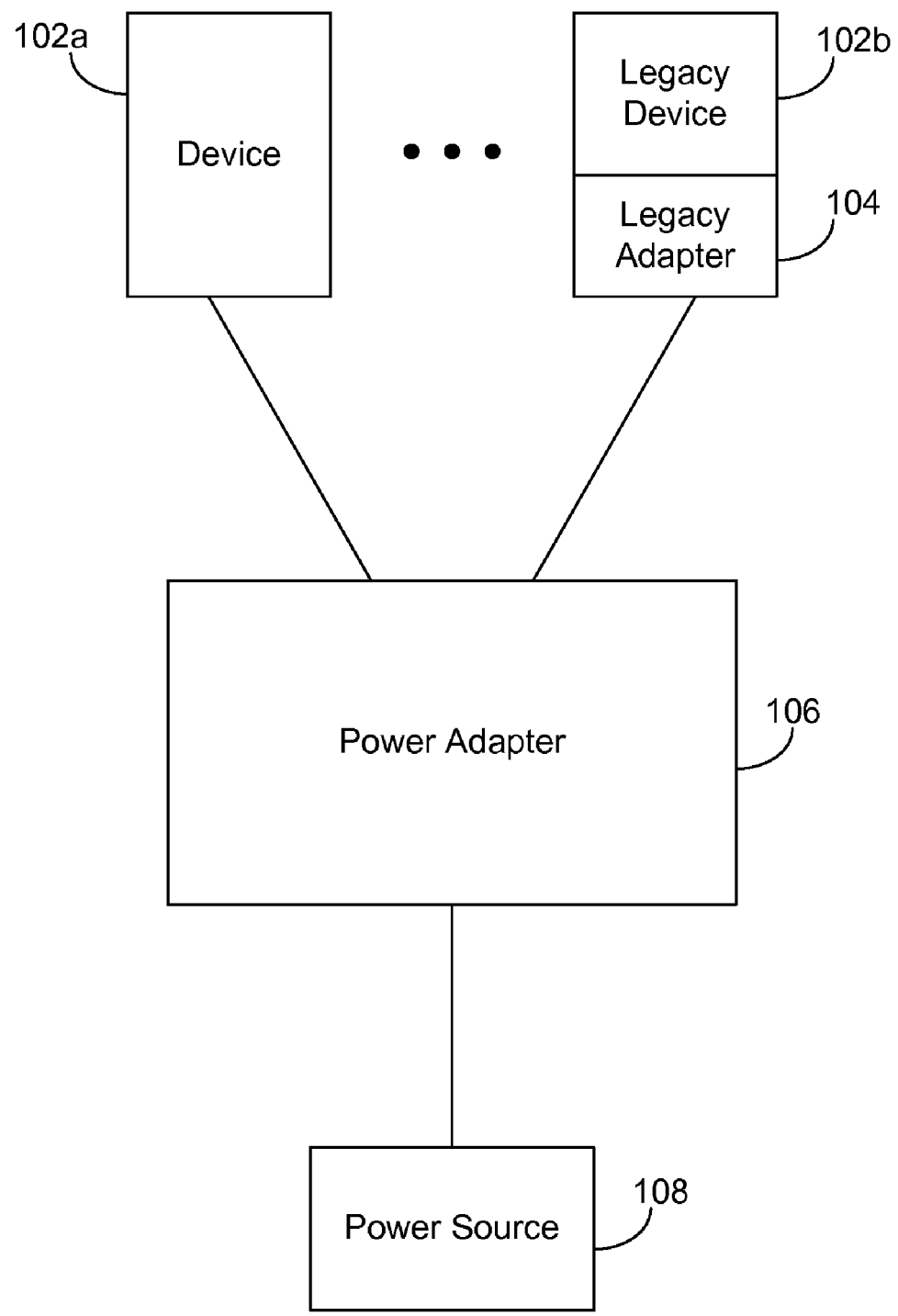
FIG. 1 is a block diagram of a power adapter coupled to a power source and devices in accordance with some embodiments.

FIG. 1 is a block diagram of a power adapter coupled to a power source and devices in accordance with some embodiments. Power source 108 supplies electrical power to power adapter 106 in order to supply electrical power to devices 102. The power source 108 may provide alternating current (AC) or direct current (DC) voltage. In some embodiments, the power source 108 is a power outlet, such as a wall outlet. The power outlet voltages outside the United States. In other embodiments, the power source 108 is an outlet in an airplane armrest or in an automobile, such as a cigarette lighter socket, which typically provides 12V DC. In still other embodiments, the power source 108 is an AC/DC converter that receives an AC input and provides a DC output to the power adapter 106. In further embodiments, the power source is a motor, generator, battery, etc. that provides electricity. Depending on the particular embodiment, the power adapter 106 may be configured for coupling to only a DC power source, only an AC power source, or either a DC or AC power source. The power adapter 106 thus functions as an AC/DC converter, a DC/DC converter, or both, depending on the embodiment. The power adapter 106 may be coupled to the power source 108 via a power cord, cable, induction, or other known ways of transmitting power.

The power adapter 106 may be coupled to one or more devices 102. The devices 102 may include any of a variety of electronic devices, including but not limited to consumer electronic devices, cellular phones, multimedia devices, computer devices and peripherals. Power adapter 106 may come in a variety of sizes. For example, power adapter 106 may be implemented in a relatively small size for ease of portability and travel convenience.

In some embodiments, the power adapter 106 is a standalone unit, external to and distinct from devices 102 to be powered by the power adapter 106. The external power adapter 106 may be electrically coupled to one or more devices 102 via power cords, cables, induction, or other known ways of transmitting power (not shown). In some embodiments, both the power adapter 106 and a device 102a conform to a common connector or interface standard; the power cord coupling the power adapter 106 to a given device, such as device 102a includes standardized connectors on one or both ends of the cord, and may, in some embodiments, be non-detachably affixed to the power adapter 106 on one end. A device 102a may be designed to use the standardized connector and be coupled to the power adapter 106 via a cord having the standardized connectors. By using standardized plugs and receptacles, the power adapter 106 can serve as a universal power adapter to any device that is designed to include a standardized plug or receptacle, such as a multi-purpose power connector.

In some other embodiments, the power adapter 106 and legacy device 102b use different types of power connectors. For example, a device that is not designed to use the multi-purpose power connector (e.g., an older device) may have a legacy power connector that is device- or manufacturer-specific and not conforming to the standard that is used by the power adapter 106. In such embodiments, the use of a legacy adapter 104 may be used to interface the power adapter 106 with the legacy device 102b.

In some embodiments, the legacy adapter 104 is a part of a cord that includes the multi-purpose power connector on one end and legacy adapter 104 on the other end, which includes a device- or manufacturer-specific connector. Accordingly, the power adapter 106 may be coupled directly to legacy device 102b via a cord that includes the multi-purpose power connector on one end and legacy adapter 104 on the other end. In other words, the cord is customized to the connector on the device because at least one connector on the cord is device- or manufacturer-specific.

In some other embodiments, an attachment, such as a dongle, may be coupled to legacy device 102b. The dongle includes legacy adapter 104 to "convert" the connector on legacy device 102b to the standardized connector utilized by power adapter 106 (i.e., the multi-purpose power connector). When using a dongle that includes legacy adapter 104, a cord with a multi-purpose power connector on both ends may be used. One end of the cord couples to the multi-purpose power connector of power adapter 106 and the other end couples to a dongle that includes legacy adapter 104. The other end of the dongle contains the device- or manufacturer-specific connector for coupling to legacy device 102b. In other words, the dongle with legacy adapter 104 contains both a multi-purpose power connector and a device- or manufacturer-specific connector, thereby allowing coupling of the power adapter 106 and legacy device 102b via a cord having the multi-purpose power connector on the device end of the cord.

Figure 2:
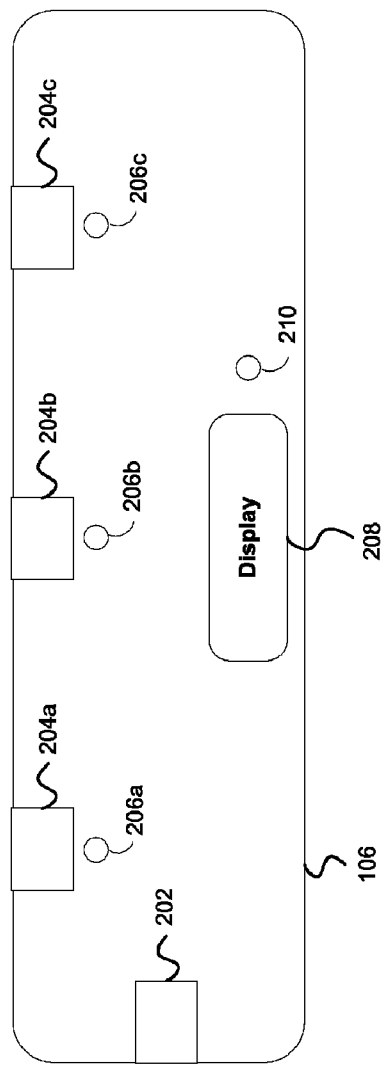
FIG. 2 is a schematic illustrating a power adapter in accordance with some embodiments.
Figure 4:
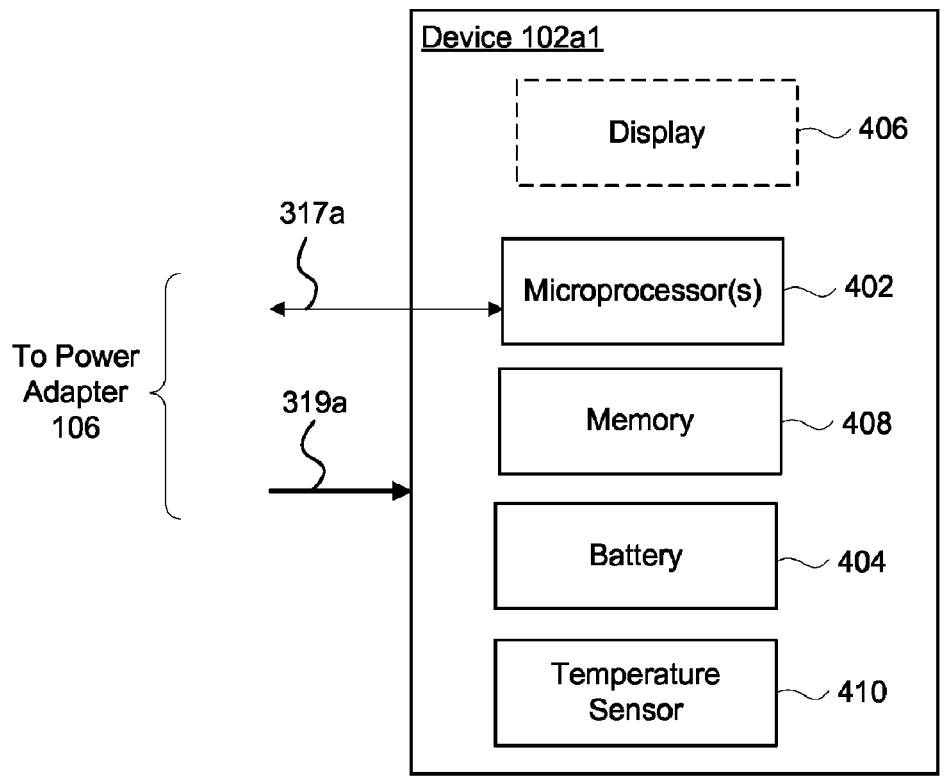
FIG. 4 is a schematic illustrating a device in accordance with some embodiments.

FIG. 2 illustrates power adapter 106 of some embodiments. Power adapter 106 includes an input port 202 for receiving power from a power source, e.g., power source 108. Power adapter 106 has multiple output ports 204 (e.g., 204a, 204b, and 204c). Input port 202 and output ports 204 can be any combination of plugs, receptacles, sockets, magnetic power connectors, non-detachable cords, etc. In one embodiment, the output ports 204 include a receptacle for receiving the multi-purpose power connector. In another embodiment, one or more cords are non-detachably fixed to one or more output ports 204. Power adapter 106 may also include a user interface for interaction with a user. In some embodiments, the user interface comprises a status light 206 (e.g., 206a, 206b, and 206c) associated with each output port 204 that may indicate whether a device is being powered, whether the device is being provided reduced power, or other statuses of power adapter 106 or devices 102 connected to the power adapter 106. Status lights 206 can indicate one or more statuses by blinking, changing colors, or the like. The user interface of power adapter 106 may also include display 208, which may be an LCD screen, an LED, or an OLED display for displaying information to a user. In some embodiments, status information can be displayed on display 208 in addition to or in place of status lights 206. For example, the background color of display 208 could change colors or blink based on the status of the devices 102 or the power adapter 106. In other embodiments, where device 102 includes a display 406 as illustrated in FIG. 4, power adapter 106 may instruct device 102 to display certain information on the display 406 of device 102. Display 406 may be an LCD screen, an LED, or an OLED display.

Furthermore, additional information about power adapter 106 may be displayed on display 208. The user interface of power adapter 106 may also include an input device so that a user can interact with power adapter 106. An example of an input device is button 210. Button 210 may be used in connection with display 208 to allow a user to access information about power adapter 106, any of the attached devices, and/or to program or otherwise interact with power adapter 106. For example, display 208 may provide information about the operating mode or charge mode of power adapter 106, current load and capacity information of each output port 204 and/or of power adapter 106, the current time, etc. Display 208 may also show information about the devices currently and or previously connected to power adapter 106 such as, device identification information, device power requirements, device battery identification information, device battery condition information, etc. When a battery in device 102 is being charged, display 208 may indicate the amount of time left until the battery is fully charged.

Button 210 could also be used to set the operating mode or the charge mode of power adapter 106 (the operating mode and charge modes are described below with reference to FIGS. 1-5). Although only one button 210 is shown, it is contemplated that multiple buttons or other control interfaces could be used, for example, to allow a user to more easily interact with power adapter 106 or to provide access to more features or information. For example, the user interface of power adapter 106 may include multiple control menus each with one or more control functions. In some embodiments, other input devices are used in place of or in conjunction with button 210. For example, display 208 could be a touch screen and thus allow input from a user. Other forms of input devices include a scroll wheel, dial, knob, joystick, trackball, and 5-way switch.

Figure 3:
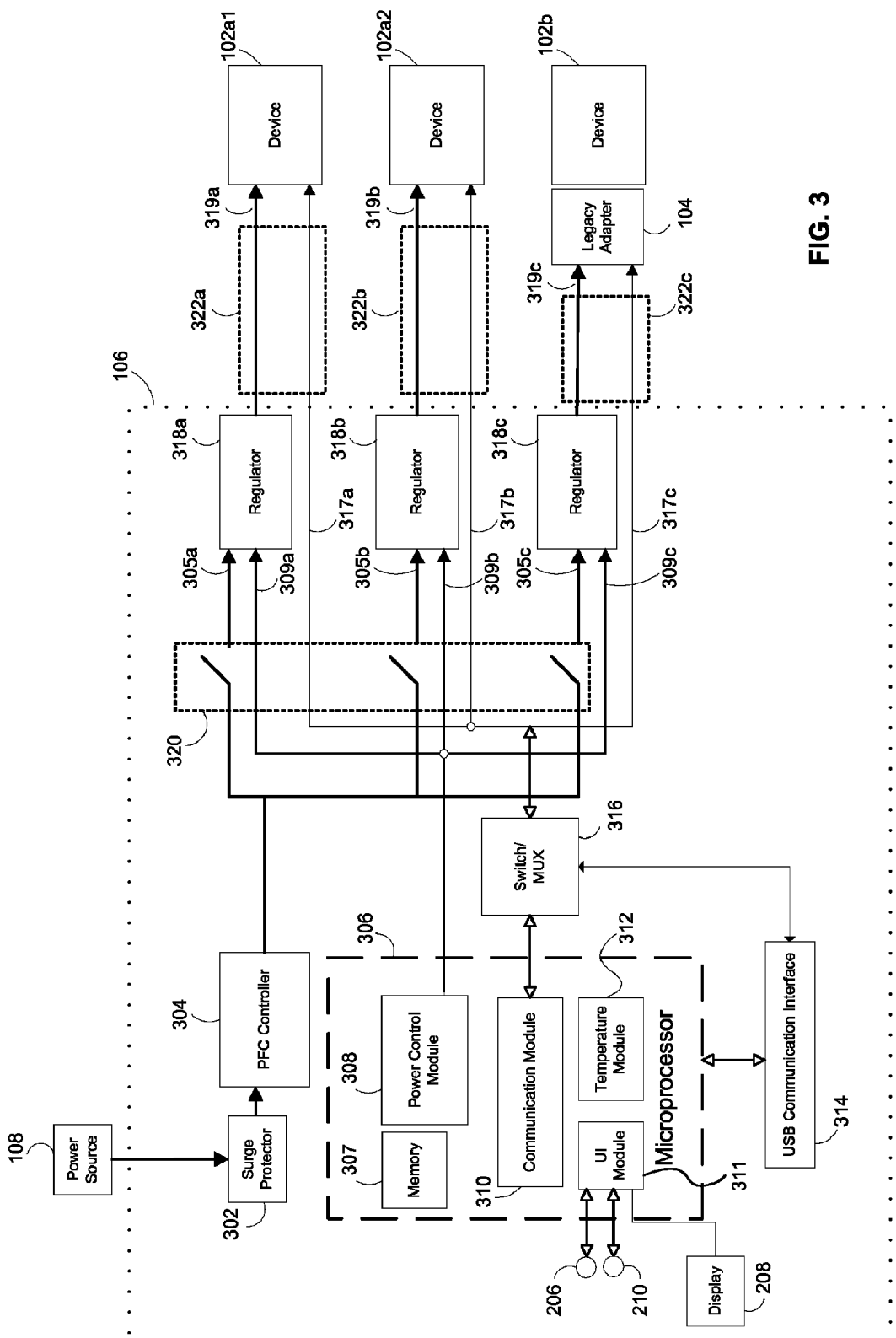
FIG. 3 is a schematic diagram of a power adapter coupled to devices, a power source, and a legacy adapter in accordance with some embodiments.

FIG. 3 is a schematic diagram of power adapter 106 including devices 102, power source 108, power cords 322, and legacy adapter 104 in accordance with some embodiments. Power adapter 106 is connected to devices 102a and legacy adapter 104 via power cords 322a, 322b and 322c, respectively. In some embodiments, power cords 322 have a multipurpose power connector on each end. Power adapter 106 receives electrical power from power source 108 into (optional) surge protector 302. The (optional) surge protector 302, which is well known in the art, may be included in power adapter 106 for protection against power surges or electrical spikes.

Figure 12A:
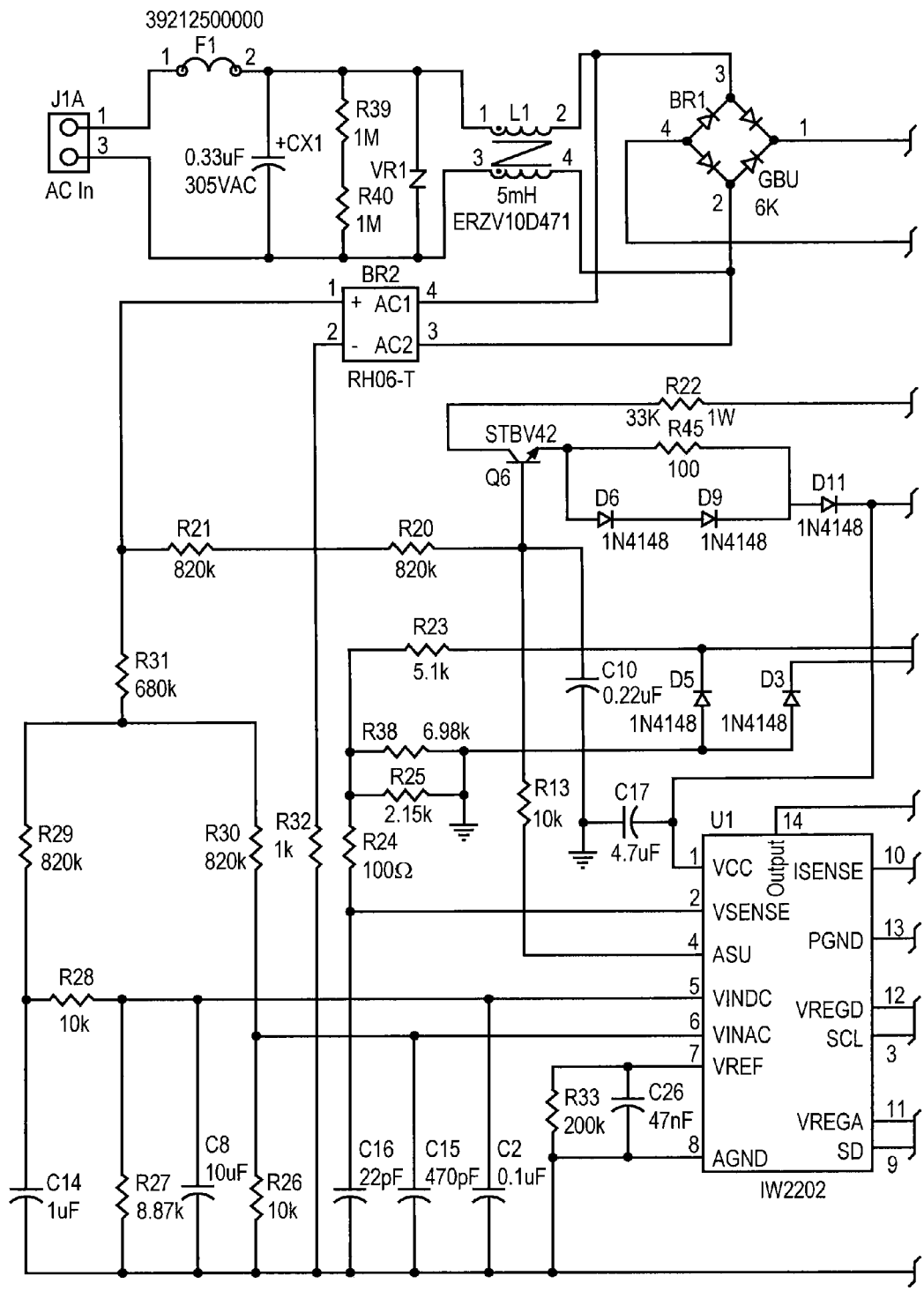
Figure 12C:
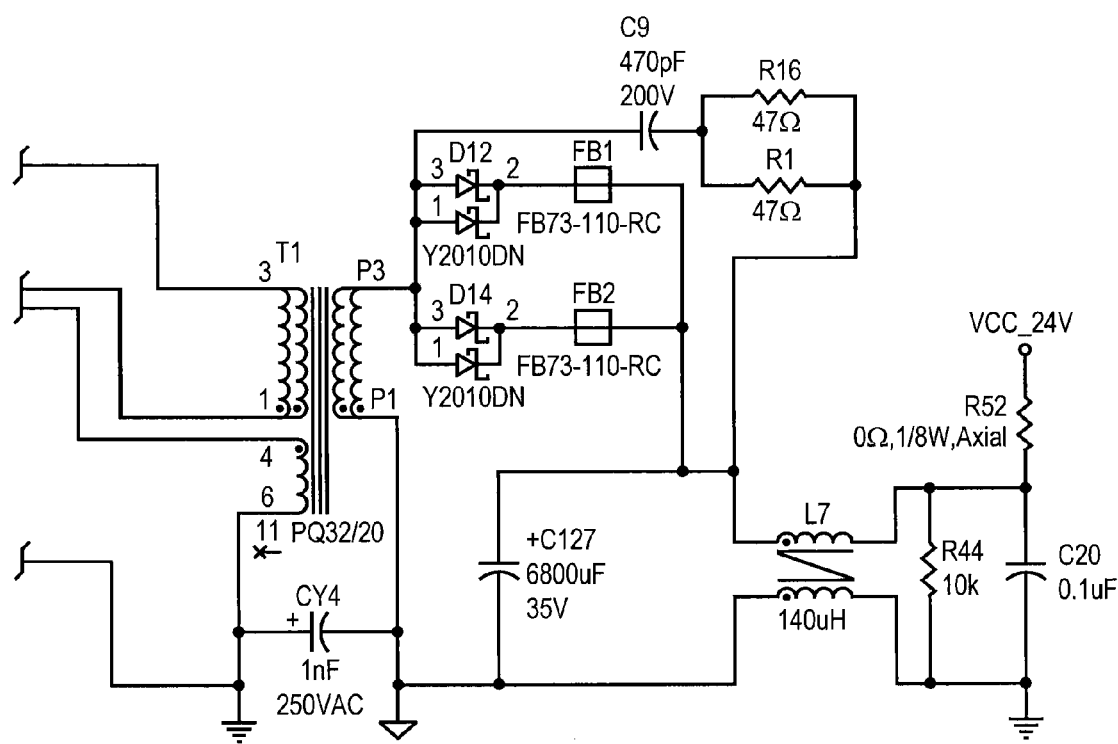

In some embodiments, power source 108 supplies AC electrical power that is fed into Power Factor Correction ("PFC") Controller 304, which converts the power from AC to DC. An exemplary circuit for PFC Controller 304 is illustrated in FIGS. 12A-C. PFC Controller outputs DC power through switches 320 to regulators 318a, 318b, and 318c via PFC power lines 305a, 305b, and 305c, respectively. In some embodiments, switches 320 are internal to regulators 318 and operate as an ENABLE/DISABLE line to disconnect the output of regulators 318. An example of this embodiment is described in more detail below with reference to FIG. 13. In some embodiments, regulators 318 are programmable switching regulators. In some other embodiments, regulators 318 are programmable linear regulators. The switches 320 are used to disconnect each regulator 318 that is not currently in use by a device 102 from PFC power lines 305. In some embodiments, when the battery of device, e.g., device 102a1, has completed charging, device 102a1 notifies power adapter 106 that the battery is fully charged and microprocessor 306 opens switch 320a to disconnect regulator 318a. When disconnected, the regulators 318 do not draw power from the PFC Controller 304 and thereby the switches 320 allow for a reduction in wasted electrical power. In some embodiments, a DC-DC converter may be used instead of or in addition to PFC Controller 304 for use with a DC power source, e.g. power source 108. In some embodiments, one or more regulators 318 are fixed-voltage regulators, e.g. operating at a fixed output of 5 volts.

A microcontroller, e.g., microprocessor 306, includes memory 307, power control module 308, communication module 310, user interface module 311, and temperature module 312. However, as would be appreciated by one of skill in the art, memory 307, power control module 308, communication module 310, user interface module 311, and temperature module 312 do not have to be in a single microcontroller, but instead, the functions related to each can be spread across multiple microcontrollers, integrated circuits, and/or microprocessors. For example, memory 307 may be implemented as a separate memory device. Furthermore, the functions associated with each of the above identified modules, which are described below, may be implemented in hardware, firmware, or software, and may correspond to sets of instructions for performing the functions. The above identified modules need not be implemented as separate modules, procedures, or software programs; instead, two or more of the modules may be implemented in a single module, procedure, or software program. Various subsets of these modules may be combined or otherwise re-arranged in various embodiments. Microprocessor 306 may be, for example, PIC24FJ64GA004-I/PT (Microchip Technology Inc. PIC24 16-bit Microcontroller).

Communication module 310 communicates digitally with devices 102a (e.g., 102a1 and 102a2) or legacy adapter 104 via communication lines 317. Communication module 310 could be designed to use I2C or any other physical-layer bus known in the art. The specific physical-layer bus used is not important to the invention. If the power adapter 106 is connected to a device 102a through the device's Universal Serial Bus ("USB") port, then the digital communication of the device 102a is directed through USB communication interface adapter 314. The USB communication interface adapter 314 may be, for example, CY7C67200 (Cypress Semiconductor EZ-OTG™ Programmable USB On-The-Go Host/Peripheral Controller). Switch/MUX 316 connects communication module 310 directly to communication lines 317 or USB communication interface adapter 314 to communication lines 317 depending on whether USB communication is needed in order to communication with device 102a or legacy adapter 104. Alternatively, USB communication module 310 could be contained within communication module 310 or could replace communication module 310 if only USB communications were needed. In which case, switch/MUX 316 would not be needed.

Communication lines 317a and 317b are in digital communication with devices 102a and communication line 317c is in digital communication with legacy adapter 104. The devices 102a and legacy adapter 104 communicate the power requirements of devices 102a and legacy devices 102b, respectively, to microprocessor 306. The power requirements can include one or more of voltage, current or wattage requirements of the devices 102. In some embodiments, the voltage requirements include three values: a nominal voltage, a negative tolerance, and a positive tolerance, which creates a window of voltage values. Similarly, the current and/or wattage requirements can include nominal values and negative and positive tolerances. Based on the power requirements of each device 102, power control module 308 instructs regulators 318 to deliver the requested power output to the device through power lines 319.

There is a separate power line 319a, 319b, or 319c associated with each regulator 318 and, consequently, with each device 102. Each regulator 318a, 318b, and 318c is independent of each other and can provide the specific power requirements of the device 102 associated with the respective regulator 318. Power control module 308 instructs each regulator 318 separately via the control line 309 associated with the regulator (e.g., 309a, 309b, and 309c). Thus, for example, power control module 308 instructs regulator 318a via control line 309a to provide the specific power requirements of device 102a1 through power line 319a. Similarly, legacy device 102b will receive the power requirement of legacy device 102b through legacy adapter 104 based on the digital communication between communication module 310 and legacy adapter 104. Legacy adapter 104 will be discussed in more detail below with respect to FIG. 5.

In some embodiments, communication line 317 and power line 319 are both contained in the same power cord 322 to connect power adapter 106 to device 102a, power adapter 106 to legacy device 102b (cord not shown), or power adapter 106 to legacy adapter 104, which connects to legacy device 102b.

In some embodiments, microprocessor 306 includes temperature module 312. Temperature module 312 can be used to monitor the temperature of power adapter 106. Temperature module 312 communicates with a temperature sensor (not shown) contained in power adapter 106. The temperature sensor in power adapter 106 measures the temperature of the power adapter 106. Temperature module 312 receives the temperature information from the temperature sensor. This temperature information can then be displayed to the user through, for example, display 208. In some embodiments, the temperature information obtained by temperature module 312 is used in connection with the round-robin charging mode described below.

The user interface module 311 is connected to the status lights 206, button 210, and display 208. The user interface module 311 processes the input provided by the user through, for example, button 210. As explained above, the user can select different modes of power adapter 106 or select to display various information about the power adapter 106, or the devices 102. This information can be displayed on display 208 and/or by activating status lights 206 and may be stored in memory 307.

FIG. 3 illustrates two devices 102a1 and 102a2 and a legacy device 102b coupled to power adapter 106. It should be noted that power adapter 106 is not limited to this configuration; power adapter 106 could have one or more output ports 204, e.g., more than 3, each with a device 102a or a legacy device 102b coupled thereto.

FIG. 4 is a schematic of device 102a1 in accordance with some embodiments. As shown in FIG. 4, power line 319a and communication line 317a couple power adapter 106 to device 102a1. In some embodiments, power line 319a and communication line 317a are provided by power cord 322a. Device 102a1 includes one or more microprocessors 402, and a battery 404. In some embodiments, battery 404 is a rechargeable battery. Communication line 317a is connected to microprocessor 402 of device 102a1. Microprocessor 402 communicates the initial power needs of device 102a1.

In some embodiments, microprocessor 402 communicates the power needs of device 102a1 on a near real-time basis. Device 102a1 communicates its power requirements from microprocessor 402 to communication module 310 via communication line 317a in regular communication intervals, e.g., every 30 seconds. Based on each of these communications, regulator 318a provides the requested amount of power to device 102a1. In some embodiments, when operating on a near real-time basis, power adapter 106 only provides power to device 102a1 for one communication interval, e.g. 30 seconds, and will not continue to provide power unless microprocessor 402 communicates the present power requirements of device 102a1 to communication module 310 before the end of that communication interval.

In some embodiments, microprocessor 402 can read the voltage on battery 404 and communicate that information to power adapter 106 along with other battery condition information. For example, microprocessor 402 can calculate the charge level of battery 404 as a percentage of the capacity of battery 404 or the amount of time until battery 404 is fully charged. Microprocessor 402 may perform this calculation based on the present voltage and current drawn by battery 404 and the charging profile of battery 404, which may be preprogrammed into microprocessor 402. In addition, microprocessor 402 and memory 408 can be used to keep track of the number of times battery 404 has been fully charged in order to adapt the charge profile of battery 404 over the life of the battery. The number of times battery 404 has been fully charged may also be used to estimate the remaining life of the battery. Microprocessor 402 may communicate all of this battery condition information to power adapter 106. In other embodiments, a separate integrated circuit, such as a "gas gauge IC," (not shown) may be in communication with microprocessor 402 and perform the aforementioned functions, namely read the voltage on battery 404, calculate the charge level of battery 404, calculate the amount of time until battery 404 is fully charged, and store the charging profile of battery 404.

In some embodiments, the battery condition information includes a temperature measured by a temperature sensor 410 in the device 102a1. The temperature sensor 410 may be a discrete component or may be integrated into another component, such as the microprocessor 402 or another IC. In some embodiments, the power adapter 106 determines the level of power to provide to the device 102a1 in accordance with the measured temperature. For example, if the measured temperature is below a first specified temperature, a "fast charge" mode is enabled in which a higher than normal level of power is provided to the device 102a. In another example, if the measured temperature exceeds a second specified temperature, the level of power provided to the device 102a1 is reduced or terminated.

As described above, devices 102 that can be electrically coupled to the power adapter 106 encompass a variety of electronic devices, including but not limited to consumer electronic devices, cellular phones, multimedia devices, computer devices and peripherals. Some of these devices 102 may include a battery or batteries 404 and some may not. The battery (or batteries) 404 may be rechargeable or non-rechargeable. Examples of rechargeable battery technologies include lithium-ion batteries, nickel cadmium batteries, and nickel metal hydride batteries. Examples of non-rechargeable battery technologies include alkaline and lithium batteries. For a device 102 that does not have a battery 404 or that has non-rechargeable batteries, the power supplied by the power adapter 106 merely powers the device 102 for operation. For a device 102 that has a rechargeable battery 404, the power supplied by the power adapter 106 powers the device 102 for operation and/or recharges the battery 404. As it is known in the art, different devices and batteries have different power requirements for operation and/or battery charging. Thus, the power adapter 106 needs to know the power requirements of the devices 102, in order to supply the proper amount of power.

Figure 5:
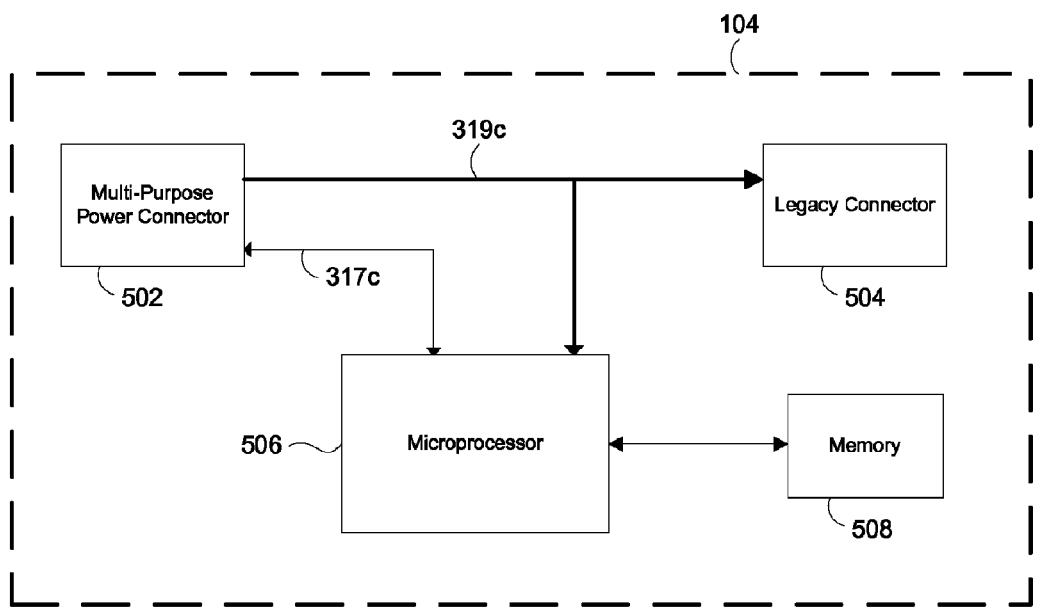
FIG. 5 is a schematic illustrating a legacy adapter in accordance with some embodiments.

FIG. 5 is a schematic of legacy adapter 104 in accordance with some embodiments. Legacy adapter 104 includes a multi-purpose power connector 502, microprocessor 506, and legacy connector 504. Multi-purpose power connector 502 is adapted to connect with another multi-purpose power connector (not shown), which does not mate electrically and/or physically with the connector on legacy device 102b. Legacy device 102b has a legacy power connector that is device- or manufacturer-specific and thus, does not conform to the standard that is used by power adapter 106, e.g., the multi-purpose power connector. Legacy connector 504 is adapted to connect to the device- or manufacturer-specific connector of legacy device 102b. Microprocessor 506 communicates digitally with communication module 310 of power adapter 106 via communication line 317c in order to provide power adapter 106 with the power requirements of legacy device 102b. In some embodiments, legacy adapter 104 includes memory 508 to store the power requirements of legacy device 102b and possibly other information relating to legacy device 102b. Memory 508 could be flash memory, an EEPROM, or may be embedded in microprocessor 506. Because legacy adapter 104 is device- or manufacturer-specific, it can be pre-programmed with the power requirements of legacy device 102b. In some embodiments, legacy adapter 104 can be programmed by power adapter 106 to update or change the power requirements of the associated legacy device 102b. In some embodiments, legacy adapter 104 does not include microprocessor 506. In these embodiments, memory 508 stores the power requirements of legacy device 102b, and microprocessor 306 of power adapter 106 reads the power requirements of legacy device 102b directly from memory 508 of legacy adapter 104.

After the power requirements are communicated to power adapter 106, as described above, power control module 308 adjusts the power output of regulator 318c to deliver the requested amount of power. Thus, regulator 318c delivers the required power to legacy device 102b through legacy adapter 104 via power line 319c in accordance with the power requirements of legacy device 102b. In some embodiments, as discussed above, the power output of regulator 318c is adjusted on a real-time basis.

With reference to FIGS. 4 and 5, in some embodiments, regulator 318a of FIG. 3 also provides a predefined wake-up voltage to devices 102a and/or legacy adapter 104. In some embodiments, the predefined voltage is +5 V. The wake-up voltage may facilitate the powering-on of a device 102a and/or digital communication between the device 102a and power adapter 106. Similarly, the wake-up voltage may facilitate digital communication between the legacy adapter 104 and power adapter 106 and thus be provided before digital communications take place. The wake-up voltage may be provided directly to microprocessor 402 or microprocessor 506 of legacy adapter 104. The wake-up voltage powers the microprocessors 402 or 506 facilitating the microprocessors 402 or 506 to initiate digital communications with communication module 310 to communicate the power requirements of the devices 102 to power adapter 106 via communication line 317.

With reference to FIGS. 1-5, power adapter 106 may provide power to multiple devices 102 simultaneously to operate the devices 102 and/or charge batteries 404 of the devices 102. It is possible that the total power requirements of all of the attached devices 102 exceeds the amount of power that power adapter 106 can provide, thus causing an overload condition. Power adapter 106 may operate in multiple different charge modes either on user request or to handle an overload condition, such as priority charging, reduced power charging, and/or round-robin charging modes. In some embodiments, power adapter 106 operates in more than one of these modes simultaneously.

In priority charging mode, power adapter 106 supplies power to one or more of the attached devices 102 that have a higher priority than the other attached devices 102. In some embodiments, each device 102 has a different priority level associated with it, which has been pre-programmed into power adapter 106. In some other embodiments, there may be a set number of priority levels, e.g., 2 or 5, or there may be a separate priority level for each output port 204. In some embodiments, a user specifies priority levels for respective output ports 204, for example by using an input device such as a button 210. Power adapter 106 provides power to as many attached devices as it can in order of priority level and based on the power requirements of each device. In further embodiments, each device 102 has either a high priority or a low priority and power adapter 106 provides power to each attached device 102 with high priority. Once the power requirements of the devices 102 with high priority has lowered, for example, because battery 404 of device 102 has completed charging, power adapter 106 will begin to provide power to the attached devices 102 with low priority.

In reduced power charging mode, power adapter 106 provides a reduced amount of power to each of the attached devices 102. For example, if an attached device 102 is in a standby mode as opposed to being fully operational and the power requirements of the device are mainly associated with charging of the battery 404 of the attached device 102, then the attached device 102 is capable of receiving a reduced amount of power compared to the power that the device 102 is requesting. The reduced power may cause battery 404 of device 102 to take longer to charge, but the attached device 102 can still function even at a reduced power. Sometimes an attached device 102 will need all of the power it is requesting to operate. In some embodiments, power adapter 106 will determine whether an attached device 102 can handle reduced power and only supply reduced power to the attached devices 102 that are able to handle the reduced power. For example, the attached device 102 may provide power adapter 106 with two power requirements, a preferred power requirement and a minimum power requirement (e.g., a power requirement for operating device 102 and charging battery 404, and a power requirement for just operating device 102). Alternatively, attached device 102 may provide voltage and current requirements that include a nominal value, a negative tolerance, and a positive tolerance, thereby creating a window for the power requirement. In other embodiments, power adapter 106 queries attached device 102 to determine if attached device 102 can reduce its power requirements. By reducing the power supplied to some of the attached devices 102, power adapter 106 may be able to provide power to more of the attached devices at one time.

In round-robin charging mode, power adapter 106 provides power to one or more attached devices 102 at one time, but less than all of the attached devices 102. Once one or more of the attached devices 102 reduces its power requirements, because, for example, battery 404 of attached device 102 has completed charging, power adapter 106 will begin providing power to another attached device 102 to which it is not currently providing power, or will increase the power provided to another attached device 102 to which it is currently providing reduced power. In some embodiments, power adapter 106 will stop providing power to the attached device 102 once it has reduced its power requirements and therefore only one device at a time is being provided power. In some other embodiments, one attached device 102 is powered at a time for a predefined time period. Once the predefined time period ends, the next attached device 102 is powered and the powering of the previous device 102 is stopped. In further embodiments, a temperature sensor contained in power adapter 106 measures the temperature of power adapter 106 and communicates this information to temperature module 312. Temperature module 312 monitors the temperature of power adapter 106. If power adapter exceeds a predetermined temperature, e.g., 70 degree Celsius, power adapter 106 throttles charging, partially charging the devices 102 attached to each output port 204 before moving on to the next output port 204 until the temperature gradient and the surface temperature are low enough to enable simultaneous charging.

Power adapter 106 may also operate in one or more operating modes. The operating modes of power adapter 106 include, for example, active use mode, standby mode, and off-peak charging mode. Active use mode is the "normal" operating mode of power adapter 106. While in active use mode, when power adapter 106 senses that its output current is reduced to below a predefined level, e.g., 100 mA, it interrogates attached devices 102 for their status. If devices 102 do not reply, or reply that their batteries 404 are fully charged, power adapter 106 transitions into standby mode. Standby mode may include two types of standby modes, maintenance mode and no-load mode, which are selectable by power port. No-load mode is the standby mode used when devices 102 are not connected to power adapter 106. Microprocessor 306 opens switches 320 to disable the regulators 318, which disconnects the regulators from PFC power lines 305. In another embodiment, microprocessor 306 disables the output of regulators 318 via an ENABLE/DISABLE pin (not shown) of the regulators 318, which disables most of its own functions thereby reducing the power consumed by regulators 318, and thus power adapter 106, to almost zero, e.g., approximately 0.5 W. When a user connects device 102 to power adapter 106, device 102 sends an interrupt signal to power adapter 106 to awaken the processor and transition power adapter 106 to active mode. Alternatively, the user can also manually wake-up power adapter 106 through its user interface.

Maintenance mode is the standby mode used when devices 102 are connected to power adapter 106, but power adapter 106 is providing a reduced amount of power because, for example, attached devices 102 are in their own standby mode. In some embodiments, when power adapter 106 is transitioned to maintenance mode, power adapter 106 instructs the attached devices to go into their own standby mode or to otherwise reduce their power requirements. For example, power adapter 106 may only provide the power needed to operate the attached devices 102 and not enough to charge the batteries 404 of the attached devices 102.

Power adapter 106 may also operate in an off-peak operating mode. In this mode, the power adapter 106 determines if any of the attached devices 102 do not require power immediately because, for example, the primary reason the attached device 102 needs power is to charge battery 404 of attached device 102. For these attached devices 102, power adapter 106 will delay providing the requested power until an off-peak time, e.g., after 10 p.m. In some embodiments, the user can set the time of charging manually through the user interface of power adapter 106. The internal clock (not shown) of power adapter 106 is then compared to the value entered by the user to control startup time. In some embodiments, power adapter 106 will delay providing power to each attached device 102 regardless of whether the device requires power immediately. In further embodiments, a user can input by what time the user would like the battery 404 of device 102 to be charged. Microprocessor 306 will calculate how long it will take to charge the device 102 and determine what time charging will need to start in order to have the device completely charged by the time entered by the user and so that as much of the charging as possible is performed during off-peak time. In some other embodiments, standby mode may be used in conjunction with off-peak operating mode. In these embodiments, power adapter 106 will remain in standby mode until an off-peak time, at which point power adapter 106 will go into a fully powered state and operate in the off-peak operating mode described above.

In some embodiments, all of the aforementioned operating modes, namely active mode, standby mode, and off-peak operating mode, operate on a per output port 204 basis. In other words, each of the output ports 204 can be in different modes simultaneously and have no impact on the operating mode of any of the other output port 204. For example, output port 204*a* could be in the maintenance mode of standby mode because an attached device 102 is connected to output port 204*a* and is in its own standby mode. Output port 204*b* could be in no-load mode of standby mode because nothing is attached to output port 204*b*, while output port 204*c* is in active mode with an attached device 102 charging its battery 404.

Referring again to FIG. 2, as described above, display 208 may show information about the devices currently and or previously connected to power adapter 106, such as device battery identification information and device battery condition information, etc. In some embodiments, the background color of display 208 will change depending on the operating mode of the power adapter 106. The background color of display 208 may also indicate how environmentally friendly the operation of power adapter 106 is being. For example, if devices 102 are being charged during off-peak time the background color of display 208 may be green. When devices 102 are being charged during an on-peak time, the background of display 208 may be amber. In further embodiments, each battery 404 in an attached device 102 has a unique identifier associated with it that may be stored in memory 307, so that power adapter 106 will be able to determine information about battery 404 such as, whether attached device 102 is using a different battery 404 since the last time device 102 was attached to power adapter 106. By using and storing this device battery identification information, power adapter 106 can also determine device battery condition information such as, the number of times battery 404 has been charged, the amount of time battery 404 has held a charge, the length of time since the last time battery 404 has been charged, and whether battery 404 needs replacement. In some other embodiments, device 102 determines some or all of the device battery condition information and communicates this information to power adapter 106 where it may be displayed on display 208 and/or stored in memory 307. One way device 102 may determine some or all of the battery condition information is by storing the battery identification information in a memory 408 in device 102 along with at least some of the aforementioned battery condition information. In some embodiments, memory 408 is embedded in microprocessor 402.

The device battery condition information may be presented to the user on display 208. In addition, status lights 206 may be used to alert the user of device battery condition information. In some embodiments, when battery 404 of device 102 is charged above a pre-determined level, power adapter 106 queries the user as to whether the user still wants to charge the battery. This pre-determined level may be chosen by the user. For example, the user may request to be alerted when battery 404 reaches 80% of its total charge. In some embodiments, the user interface of power adapter 106 includes a speaker (not shown) or the like to produce sound, which also may be used to alert the user of device battery condition information such as whether battery 404 needs replacement or that battery 404 has reached a per-determined level of charge.

It is contemplated that other aspects of device 102 may be monitored by power adaptor 106 and/or communicated from device 102 to power adapter 106. For example, power adapter 106 may be able to determine that device 102 is malfunctioning, is overheating, is in need of upgrading or has updates available (e.g., new firmware), etc. either as part of normal communication between the power adapter 106 and device 102 or based on the communication of proprietary information. Power adapter 106 may also determine what operating mode device 102 is in, e.g., standby, charging, fully operational, etc. In addition, information about these different aspects of device 102 may be displayed to the user via, for example, display 208 and/or status lights 206. In some embodiments, power adapter 106 will determine the amount of power to provide to device 102 based on device battery condition information, the operating mode of device 102, and/or other aspects of device 102. Beyond what power adapter 106 may be able to determine for the attached devices 102, in some embodiments, device 102 communicates proprietary information to power adapter 106. Proprietary information is information outside of the standard information communicated between power adapter 106 and device 102 and is device- and/or manufacturer-specific information about device 102. For example, some or all of the information described above may be based on the proprietary information instead of normal communication between the power adapter 106 and device 102. Power adapter 106 may be able to determine that device 102 is malfunctioning, is overheating, is in need of upgrading or has updates available (e.g., new firmware), etc. based on proprietary information. The proprietary information may also be used to determine the power requirements of the device and determine whether the device is genuine.

Figure 6C:
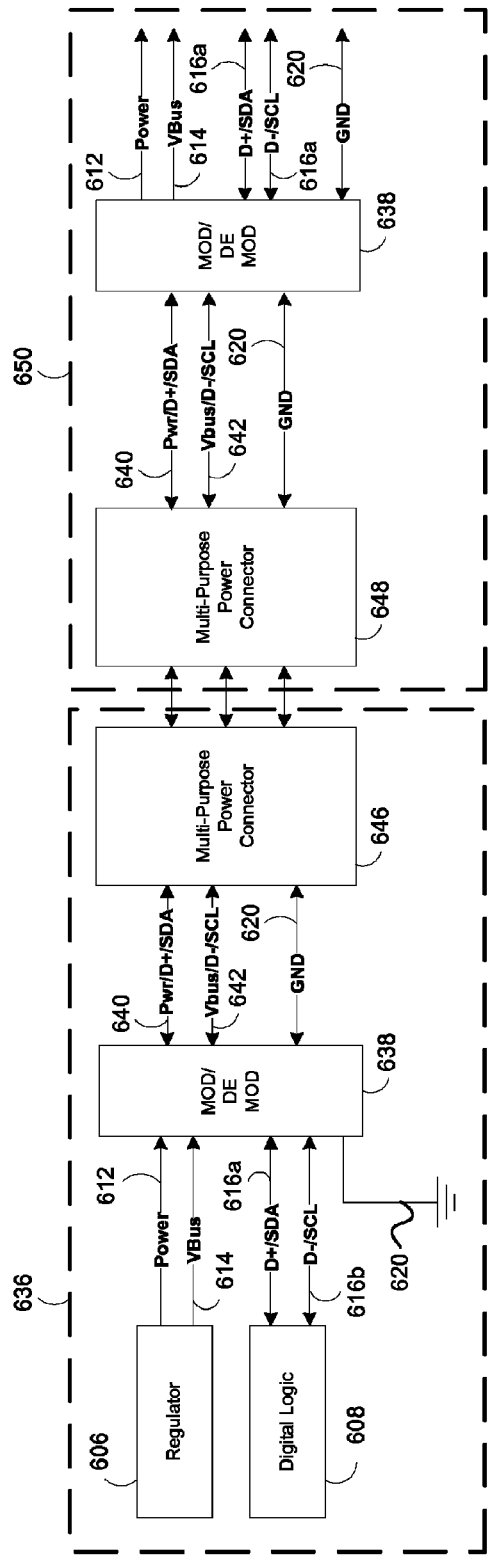

FIG. 6A is a schematic illustrating an exemplary embodiment of a power adapter 602 and device 604. In some embodiments, power adapter 602 includes a regulator 606, digital logic 608 and a multi-purpose power connector 610. As described herein, a connector could be a plug, a receptacle, a socket, or a magnetic power connector. Regulator 606, similar to regulators 318, receives DC power (from, e.g., PFC Controller 304) and outputs regulated DC power on power line 612 and/or VBus line 614. Digital logic 608 communicates digitally with device 604 via signal lines 616a and 616b. However, as described below with reference to FIG. 6C, in some embodiments, the communication can be over the power line instead of one or more signal lines.

The power line 612, VBus line 614 and signal lines 616 are electrically connected to multi-purpose power connector 610 along with ground 620. Multi-purpose power connector 610 is coupled with multi-purpose power connector 622 thereby connecting power adapter 602 and device 604. Device 604 includes a multi-purpose power connector 622, microprocessor 626, and the load 624 of device 604. Device 604 is also provided with power line 612, VBus line 614, signal lines 616a and 616b, and ground 620.

Digital logic 608 communicates digitally with microprocessor 626 via signal lines 616. The signal lines 616 could operate in accordance with the I2C physical-layer bus and/or be compatible with the USB protocol. As shown in FIG. 6, the "D+" and the "D−" shown on signal lines 616 represent a differential signal D+/D−. The "SDA" and "SCL" are used in an I2C bus and stand for "serial data line" and "serial clock line," respectively. The I2C-Bus Specification (Philips Semiconductors, "The I2C-BUS specification", Version 2.1, January, 2000) and the Universal Serial Bus Specification (USB Implementers Forum Inc, Universal Serial Bus Specification Revision 2.0, 2000) are hereby incorporated by reference. In some embodiments, a single signal line replaces signal lines 616 and is used for the digital communication. All of these implementations are well known in the art and which method being used is not important to the present invention. Microprocessor 626 communicates the power requirements of device 604. The power requirements can include one or more of voltage, current, or wattage requirement of device 604. Based on the power requirements of device 604, digital logic 608 instructs regulator 606 to provide the requested power to device 604 through power line 612.

Regulator 606 also provides a predefined wake-up voltage via VBus line 614 to device 604. The wake-up voltage may facilitate the powering-on of a device 604 and/or digital communication between the device 604 and power adapter 602. In some embodiments, the wake-up voltage directly powers the microprocessor 626 via VBus line 614, facilitating the microprocessor 626 to initiate digital communications with digital logic 608 to communicate the power requirements of the device 604 to power adapter 602 on signal lines 616. The wake-up voltage may be only initially applied to facilitate the communication of the power requirements of device 604 and then shut off (e.g. go to 0 volts), or it may be supplied continuously even after the initial power requirements have been communicated.

The regulated power supplied via power line 612 is used to power the load 624 of the device 604. The load 624 includes the active components of device 624 and may also include such components as a battery and another microprocessor (not shown). In some embodiments, microprocessor 626 is dedicated to communicating with device 602. In other embodiments, microprocessor 626 is used to operate device 604 in addition to communicating the power needs of the device 604. Therefore, device 604 may also include a communication line 628 connecting microprocessor 626 with load 624 to control other aspects of device 604.

FIG. 6B is a schematic illustrating a power adapter 602 and legacy adapter 630. Power adapter 602 in FIG. 6B is described above with reference to FIG. 6A. Legacy adapter 630 includes a multi-purpose power connector 622, microprocessor 632 and legacy connector 634. Legacy connector 634 is a legacy power connector that is device- or manufacturer-specific and not conforming to the standard that is used by the power adapter 602, i.e., the multi-purpose power connector, and therefore the legacy device cannot directly mate physically and/or electrically with multi-purpose power connector 610. Legacy connector 634 is adapted to connect to the device- or manufacturer-specific connector of a legacy device (not shown). Microprocessor 632 communicates digitally with digital logic 608 of power adapter 602 via signal lines 616a and 616b in order to provide power adapter 602 with the power requirements of the legacy device associated with legacy adapter 630. Legacy adapter 630 includes a memory 633 to store the power requirements of the associated legacy device. In some embodiments, memory 633 is embedded in microprocessor 632. As described above, once the power requirements are communicated to power adapter 602, regulator 606 provides the required power to the legacy device through power line 612, which is connected to legacy connector 634.

Because legacy adapter 630 is device- or manufacturer-specific, it can be pre-programmed with the power requirements of an associated legacy device. In some embodiments, legacy adapter 630 can be programmed by power adapter 602, for example, through signal lines 616 to update or change the power requirements of the associated legacy device stored in memory 633. VBus line 614 is used to provide a wake-up voltage to microprocessor 632 as described above with reference to FIG. 6A and microprocessor 626. In some embodiments, legacy adapter 630 does not include microprocessor 632. In these embodiments, memory 633 stores the power requirements of the associated legacy device and digital logic 608 of regulator 602 reads the power requirements of the associated legacy device directly from memory 633 of legacy adapter 630.

FIG. 6C is a schematic illustrating a power adapter 636 and a client 650. Client 650 illustrates a device (e.g., device 604) or a legacy adapter (e.g., legacy adapter 630) that uses modulator/demodulator 638. In some embodiments, the number of wires between the power adapter 602 and device 604 or power adapter 602 and legacy adapter 630 may be reduced by having the digital communications travel over the power lines. Power adapter 636 is similar to power adapter 602 except power adapter 636 includes a modulator/demodulator 638 in between the regulator 606 (and digital logic 608) and multi-purpose power connector 646 to drive data onto the power line and receive data from the power line.

The modulator/demodulator 638 operates the same in power adapter 636 and client 650. The modulator/demodulator 638 receives power line 612, VBus line 614, and signal lines 616a and 616b and also provides a ground 620. The modulator/demodulator 638 modulates the digital data from the signal lines 616 to combine the data and power signals into a single wire for each power/signal combination. Therefore, first modulated line 640 includes the power from power line 612 and the signal from signal line 616a and second modulated line 642 includes the power from VBus line 614 and the signal from signal line 616b. The modulator/demodulator 638 also does the reverse by splitting the power and signal information from first modulated line 640 to power line 612 and signal line 616a and from second modulated line 642 to VBus line 614 and signal line 616b. Each modulator/demodulator 638 of power adapter 636 and client 650 operate in both directions, i.e., modulate and demodulate the power and signal information. In some embodiments, the HomePlug® specification for communication over a power line is used for the digital communication. The HomePlug 1.0 specification (HomePlug Powerline Alliance, Inc., HomePlug 1.0 Technical White Paper) and the HomePlug AV specification (HomePlug Powerline Alliance, Inc., HomePlug AV White Paper, 2005) are hereby incorporated by reference.

FIGS. 6A, 6B, and 6C illustrate power adapters 602 and 636 with a single multi-purpose power connector 610 and 646. However, it is appreciated by one of skill in the art that power adapters 602 and 636 are not so limited. Power adapters 602 and 636 could have one or more multi-purpose power connectors 610 and 646 for use with one or more devices 604, legacy adapters 630, or a combination thereof.

Still referring to FIGS. 6A, 6B, and 6C, in some embodiments, multi-purpose power connector 610 or 646 is a plug that mates with multi-purpose power connector 622 or 648, which is a receptacle. In another embodiment, multi-purpose power connector 610 or 646 and 622 or 648 are both receptacles and are connected by a power cord with a multi-purpose power plug on both ends.

Figure 7:
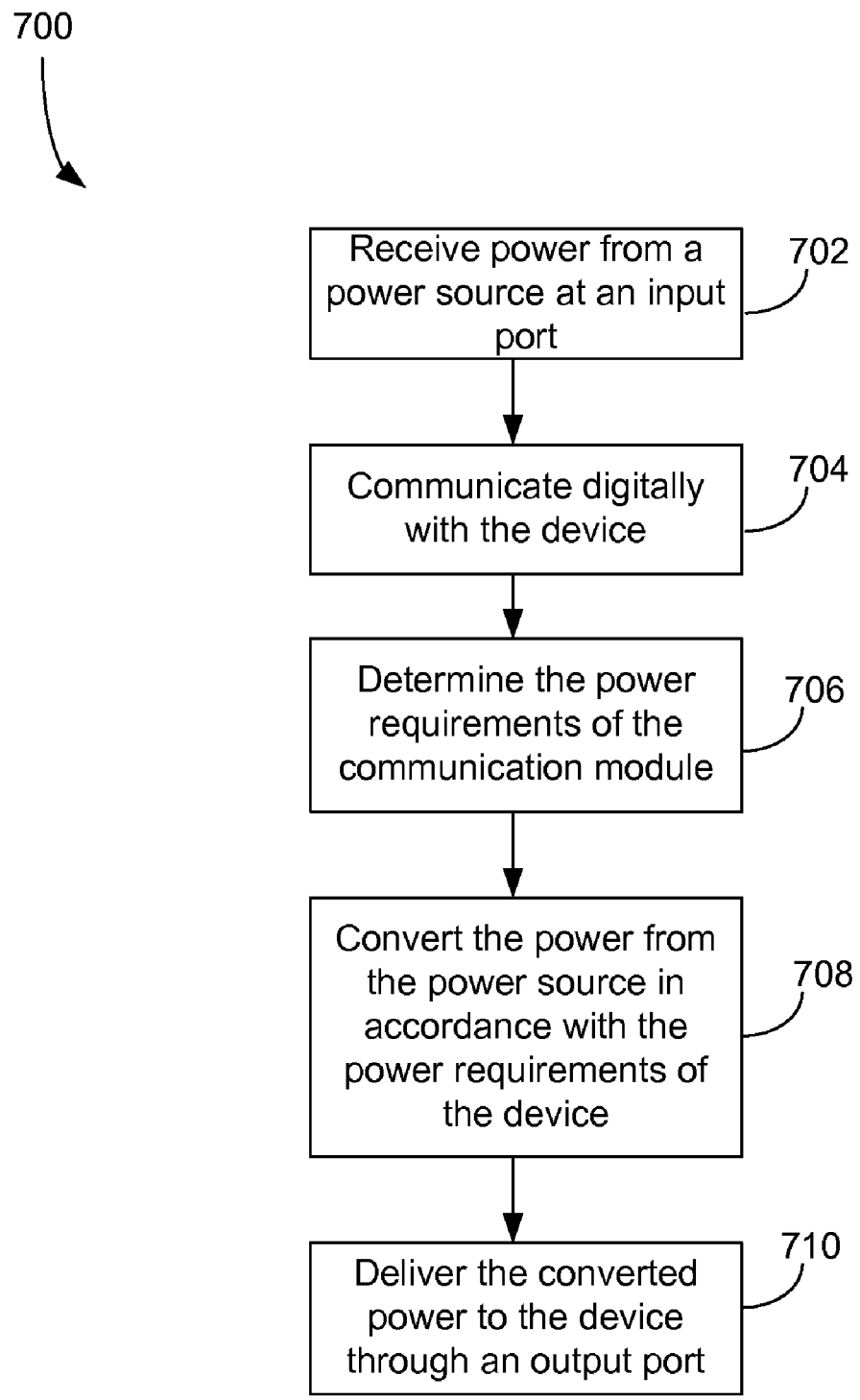
FIG. 7 is a flow diagram illustrating a method of adapting power to one or more devices in accordance with some embodiments.

FIG. 7 is a flow diagram illustrating a method of adapting power to one or more devices in accordance with some embodiments (700). In order to supply power to a device, e.g., device 102 or 604, power is received from a power source, e.g., power source 108, at an input port (701). When a device is first connected to a power adapter, e.g., power adapter 106 or 602, the power adapter communicates digitally with the device (704). Based on the digital communication between the power adapter and the communication module, the power requirements of the device are determined (706). In some embodiments, the digital communication includes a voltage, a current, and/or a wattage requirement of the device. In other embodiments, the digital communication includes a selection code to select the power requirements from a set of available power requirements. The available power requirements are stored, for example, in a look-up table in the device. Power received from the power source is converted based on the power requirements of the device (708). The converted power is delivered to the device through an output port (710) in order to power the device for operation. In some embodiments, the device contains a battery and the power delivered to the device is used to charge the battery of the device in addition to powering the device for operation or in place of powering the device for operation. The method 700 provides the ability to deliver power to a wide-range of devices.

Figure 8:
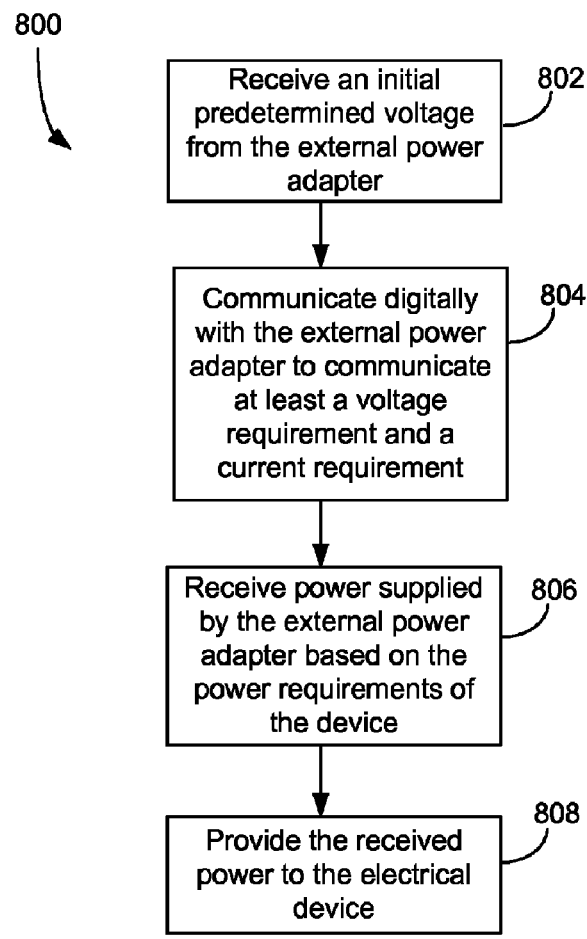
FIG. 8 is a flow diagram illustrating a method of receiving power from an external power adapter external to an electrical device in accordance with some embodiments.

FIG. 8 is a flow diagram illustrating a method of receiving power from a power adapter external to an electrical device in accordance with some embodiments (800). When a device or legacy adapter (e.g., device 102 or 604 and legacy adapter 104 or 630) is first electrically coupled to an external power adapter it receives an initial predefined voltage from the external power adapter, e.g., power adapter 106 or 602 (802). The initial predefined voltage facilitates communication between the external power adapter and the legacy adapter or the device by providing enough power for the legacy adapter or the device to communicate digitally with the external power adapter to communicate at least a voltage requirement and a current requirement (804). Power is received by the legacy adapter or the device based on the digital communication with the external power adapter (806). The legacy adapter provides the received power to the electrical device (808). The method 800 provides the ability of a device to receive power specific to the needs of the device.

Figure 9:
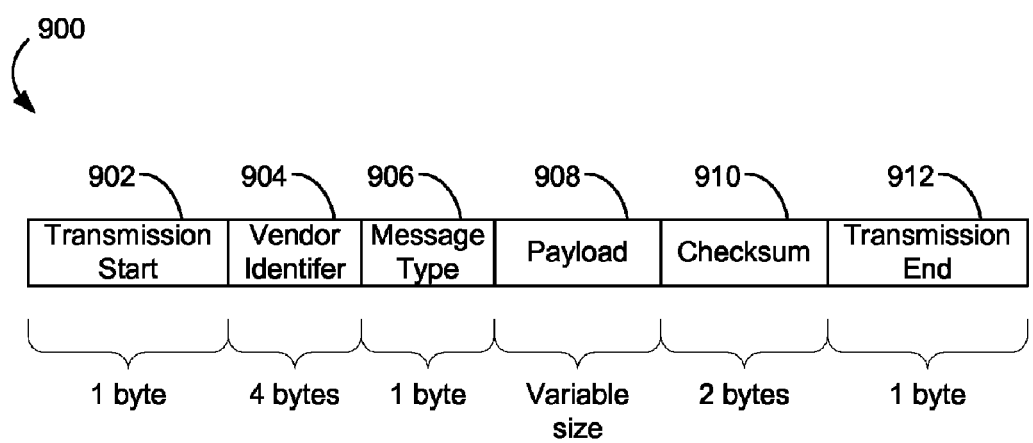
FIG. 9 is a diagram illustrating a packet structure of a digital communication between the power adapter and a legacy adapter or a device in accordance with some embodiments.

FIG. 9 is a diagram illustrating a packet structure of a digital communication between the power adapter and the legacy adapter or device in accordance with some embodiments. The digital communication between the power adapter 106 or 602 and devices 102 or 604 or legacy adapter 104 or 630 may conform to a predefined packet-based protocol. Communications may be initiated by power adapter 106 or 602, device 102 or 604, or legacy adapter 104 or 630. An exemplary digital message packet 900 includes a 1-byte transmission start segment 902 indicating the start of the message, a 4-byte vendor/manufacturer identifier 904, which may be used as an address, a 1-byte message type segment 906 indicating the type of message, a variable size payload 908, a 2-byte checksum 910, and a 1-byte transmission end segment 912 indicating the end of the packet. It should be appreciated that the sizes of the packet segments described above are merely exemplary and that alternate segment sizes may be used. For example, the transmission start segment 902 and the transmission end segment 912 may each be less than 1 byte long. As another example, the vendor/manufacturer identifier 904 may be 2 bytes rather than 4 bytes.

The checksum 910 is used for error detection. The checksum 910, as used herein, refers generally to any kind of redundancy check for error detection. The checksum 910 may be implemented using any of a variety of error detection technologies now known or later developed, including but not limited to cyclic redundancy checks, checksum algorithms, and hash functions.

In an exemplary embodiment, the protocol includes at least four message types. The message types may include three flow control message types and a power statement message type. The flow control message types serve to signal success or error in the receipt of messages. In some embodiments, the flow control message types include the acknowledgement message (ACK), the non-acknowledgement message (NACK), and the cancel message (CAN). These messages are further described below, in relation to FIGS. 10-11. A power statement message type specifies the power requirements of the device. In some embodiments, the power statement includes, e.g., voltage, current, and/or battery type parameters. In some other embodiments, the power statement includes more or less parameters than described above. If a manufacturer wishes to enable exchange of proprietary information via the digital messages, a proprietary or manufacturer-specific message type may also be included. The contents of the proprietary or manufacturer-specific messages are described above with reference to communicating proprietary information. In some embodiments, all or part of the proprietary or manufacturer-specific message may be encrypted. The encryption algorithm used may be RSA, DSA, or other encryption algorithms now known or later developed. In further embodiments, power adapter 106 sends an encrypted challenge message to device 102 based on the device identification information in order to authenticate the device 102.

For flow control messages such as ACK, NACK, and CAN, the payload 908 may be omitted (i.e., 0 bytes). For power statement messages, the payload 908 may include the power requirements information or information from which power requirements may be identified. In an embodiment where the power adapter 106 can accept messages containing proprietary information from the device, the payload 908 may include the proprietary information structured in a manufacturer-specified format and size.

In some embodiments, the payload 908 is a binary encoded segment containing voltage and current requirements of device 102. For example, the payload 908 is a binary encoded segment that specifies the nominal value and corresponding window of the output voltage and the nominal value and corresponding window of the current to be supplied by the power adapter 106. In other embodiments, the payload 908 may contain one or more of voltage, current, and wattage parameters. In an exemplary embodiment, payload 908 includes a first power segment and a second power segment. The first power segment includes a binary encoded whole number that corresponds to a wattage parameter or value. The second power segment includes a binary encoded decimal number that corresponds to a fraction of a watt. For example, in some embodiments, when device 102 communicates power requirements of 1.3 watts, the payload 908 includes a first power segment that includes an encoded "1" and the second power segment includes an encoded "3." Alternatively, the voltage and current requirements can each be represented as 16-bit binary quantities, e.g., 1 mV/bit for the voltage requirement and 1 mA/bit for the current requirement. In other embodiments, payload 908 includes the voltage and current requirements of device 102 as UTF-8 (Unicode Transformation Format) or ASCII (American Standard Code for Information Interchange) values to the nearest tenth of a volt and the nearest milliamp respectively.

In addition, the payload 908 may include other information about device 102, for example, battery identification information, battery condition information, device identification information, whether the device 102 includes a battery 404, the type of battery 404 in the device 102 (e.g., lithium-ion, nickel metal hydride, etc.), whether the desired voltage for the device is positive or negative, and operating mode of device 102.

As mentioned above, in some embodiments, the digital communication between the power adapter 106 or 602 and devices 102 or 604 or legacy adapter 104 or 630 may take place over the USB protocol. For example, the USB stack can include a configuration specific to power adapter 106. Thus, when this configuration is set active, the command control transfer parser will be able to interpret commands specific to power adapter 106. The processing of the commands specific to power adapter 106 would happen after Chapter 9 enumeration of the USB protocol. (i.e., Chapter 9 of the USB Implementers Forum Inc, Universal Serial Bus Specification Revision 2.0, 2000, which is incorporated by reference). The standard device request SET_DESCRIPTOR would set the configuration specific to power adapter 106 active. This configuration is identified by using a string descriptor specific to configuration of power adapter 106, e.g., "power adapter." Furthermore, when the bmRequestType=0x00, standard USB commands such as SET_DESCRIPTOR or GET_DESCRIPTOR will behave as normal. By setting the bmRequestType field equal to 0x40, this value is interpreted by the standard USB stack as a mode where the bytes in bRequest are user defined. Accordingly, 256 possible encodings are available for commands specific to power adapter 106.

In other embodiments, memory 307 stores a database of predefined power profiles. A power profile is a predefined set of data that specifies power requirements, or more particularly, a predefined combination of power requirement parameters. In some embodiments, a power profile includes one or more of the following: a constant voltage value, a constant current value, a wattage value, an upper limit current value, and a battery type. The power profiles may be organized as a lookup table in memory 307, with each power profile referenced by an identifier. A device 102 may communicate, in a digital message, the identifier of the desired profile to the microprocessor 306. The microprocessor 306 retrieves from memory 307 the power profile corresponding to the identifier provided by the device 102. Parameters in the retrieved power profile are used to configure regulators 318.

It should be appreciated, however, that the packet protocol and encodings described above are merely exemplary. The protocol may take on an alternative format and may include more or less information that that described above. Furthermore, the parameters may specified by an alternative format or encoding other than those described above.

Figure 10:
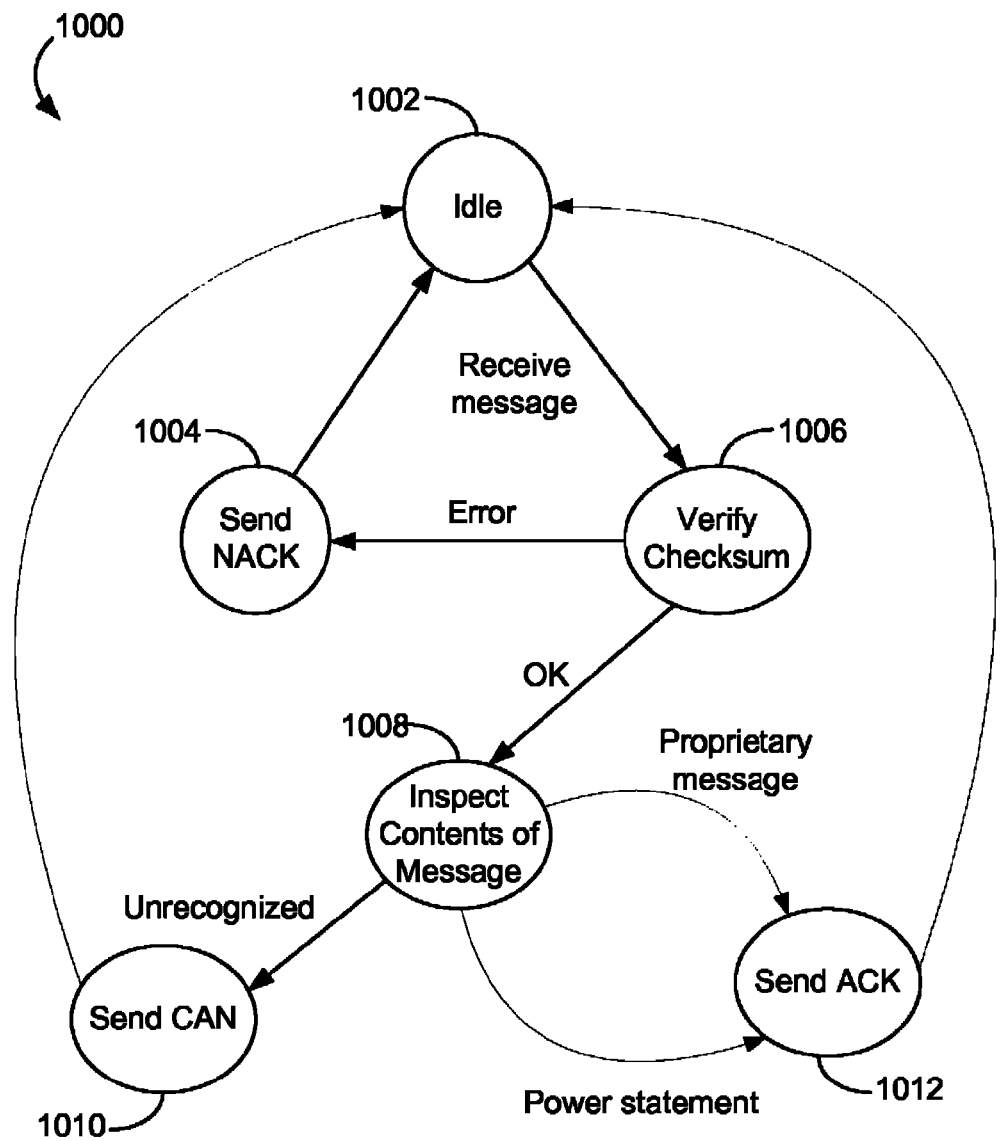
FIG. 10 is a state diagram illustrating digital communication states of a power adapter in accordance with some embodiments.
Figure 11:
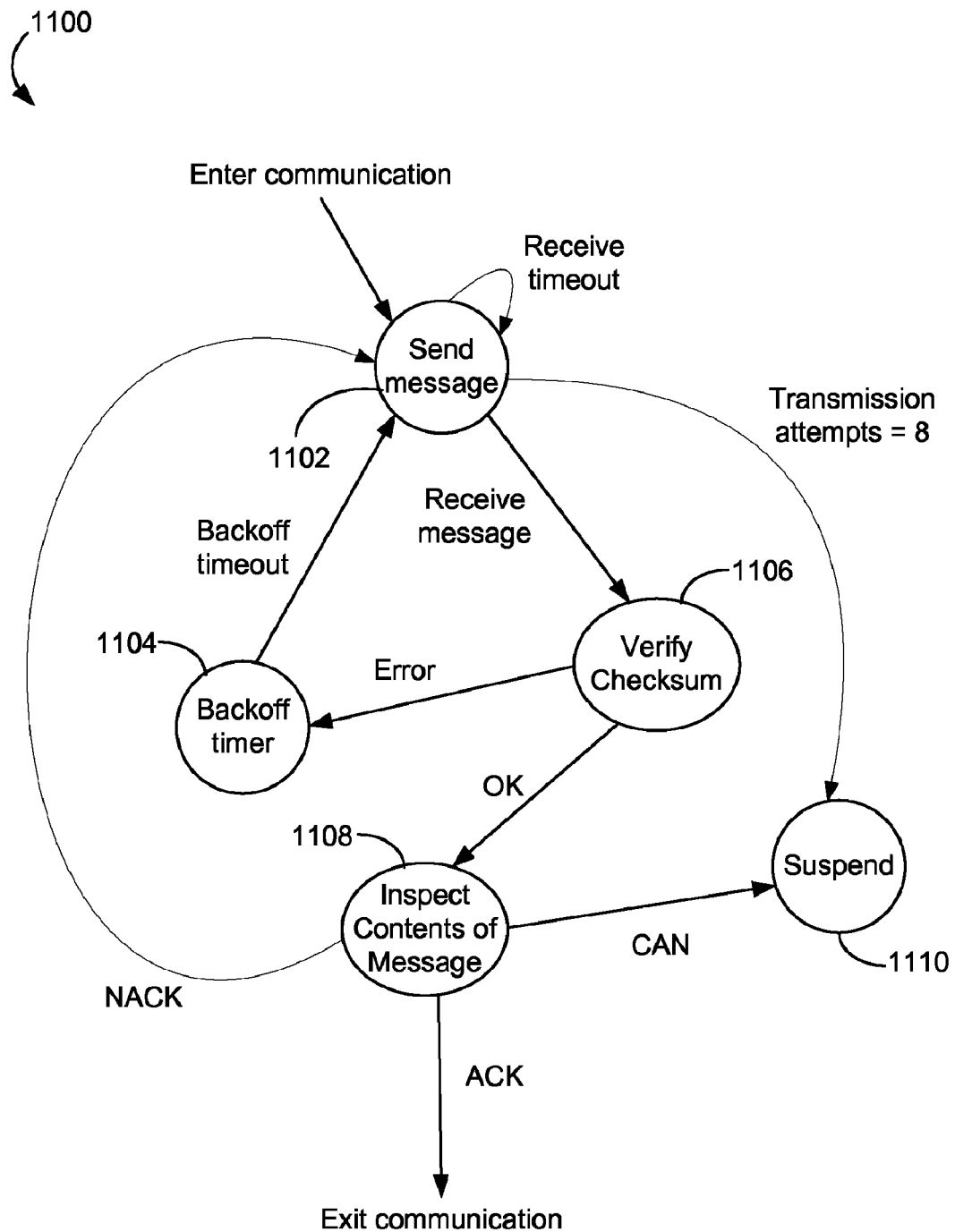
FIG. 11 is a state diagram illustrating digital communication states of a client in accordance with some embodiments.

FIGS. 10 and 11 are state diagrams illustrating digital communication states of a power adapter and of a client, respectively, in accordance with some embodiments. A client can be, for example, device 102 or 604 or legacy adapter 104 or 630. The power adapter state diagram 1000 and the client state diagram 1100 illustrate the states of the power adapter and the client, respectively, with respect to the digital communication between the power adapter and the client.

The power adapter is initially in an idle state (1002) with respect to a client. For example, while the client is not electrically coupled to the power adapter, the power adapter is in the idle state 1002 with respect to the client. While the power adapter is in the idle state 1002, the power adapter is passively waiting for a message from the client. It should be appreciated that the power adapter may be in the idle state 1002 with respect to a client that is electrically coupled to the power adapter. It should further be appreciated that while a power adapter is in the idle state 1002 with respect to one client, it may be in another state with another client that is electrically coupled to the power adapter. After a message from the client is received by the power adapter, the power adapter performs error detection on the message from the client by verifying the checksum 910 (1006). If there is an error, a NACK message is sent to the client (1004) and the power adapter returns to the idle state 1002 to wait for the next message from the client. If the message does not contain errors, the contents of the message, including the vendor code 904 and the payload 908, is inspected (1008). If the message is unrecognized, for example, because it is a proprietary message and the vendor or manufacturer code 904 is an unrecognized vendor or manufacturer (e.g., because the power adapter has not been programmed to recognize the proprietary message), a CAN message is sent (1010) and the power adapter returns to the idle state 1002. If the message is recognized, an ACK message is sent (1012) and the power adapter returns to the idle state (1002) to wait for further messages from the client. It may be the case that once the power adapter recognizes the message and sends an ACK message, the power adapter may configure itself to supply power to the client.

A client, when coupled to a power adapter, may enter into a communication mode and send a message (1102). For example, when the client is first connected to the power adapter, the client may draw power from the wake-up voltage to power its microprocessor (e.g., microprocessor 402, 506, 626, or 632) and initiate digital communications by sending a message, such as a power statement message. After a message is sent, the device or legacy device waits for a response message from the power adapter. If no response is received after a predefined receive timeout, the message is resent (1102). If, after a predefined number of attempts, e.g., 8 attempts, to transmit the same message, no response is received, the client goes into a suspend state 1110. In some embodiments, while in the suspend state, a client will no longer attempt to send a proprietary message, although non-proprietary information may still be sent. In other embodiments, for example after a receive timeout, a client will no longer attempt to transmit messages until a new power adapter connection is established.

If a response message is received, the client performs error detection on the message from the power adapter by verifying the checksum 910 (1106). If there is an error, the client backs off in accordance with a backoff timer (1104). After the backoff timer has timed out, the message is resent (1102).

If the message does not have errors, the contents of the message, particularly the message type, is inspected (1108). If the message is an ACK message, the client exits the communication mode. If the message is a NACK message, the client backs off in accordance with backoff timer (1104) and then resends the message (1102). Of course, the client may enter the communication mode later, to send another message, if needed. If the message is a CAN message, the client enters the suspend state 1110. In embodiments where the client can send messages containing proprietary information, a CAN message means that the power adapter does not recognize the vendor/manufacturer of the client, as indicated by the vendor/manufacturer identifier 904. This means that any message containing proprietary information will not be properly processed by the power adapter since the power adapter will not know the proper format of the proprietary information payload. Therefore, the client enters into the suspend state 1110, where the client will suspend transmission of information that invoked the CAN response, i.e., the client will not send messages with proprietary information to the power adapter, although other communications may take place.

FIGS. 12A-C are circuit schematics illustrating PFC Controller 304 in accordance with some embodiments. As shown in FIGS. 12A-C, the input circuitry includes several filtering components that serve to keep electrical noise from the power supply from exiting via the connector J1A. This filtering includes a common-mode choke L1, a capacitor CX1, and another stage of filtering composed of C1, L2, C2, and C18. The AC-mains are rectified by component BR1 and imposed across the primary of transformer T1. The power circuitry includes MOSFET switch Q2 that during an ON state draws current directly from a rectified sinusoid voltage and supplies energy to the primary winding magnetizing inductance of T1. The secondary diodes D12 and D14 are reverse biased in this ON state and the output current is supplied by capacitor 127. When Q2 turns OFF, diodes D12 and D14 conduct and the stored energy from the primary inductance T1 is delivered to the output.

The control of Q2 is achieved by U1, a control IC (e.g., IW2202, iWatt Digital Single-Stage PFC Controller), which has the function of modulating the frequency and duty-cycle of the gate drive pulse to Q2 in such a fashion as to ensure the average of the primary current is sinusoidal and in phase with input sinusoidal voltage such as to achieve a high Power Factor and to achieve low total harmonic distortion (THD). Cycle by cycle current limiting is provided by sense resistors R8, R41, R42, and R43 feeding a voltage to pin ISENSE of U1. Regulation against AC-line voltage changes is achieved via bridge rectifier circuit BR2 and associated resistor-capacitor voltage-attenuation and filtering which provide the DC-value of the input AC-voltage to the Vin-DC pin of U1. Additionally BR2 and its associated circuitry also provide a sense signal representing the AC-line voltage which is used to regulate the input current sinusoidal shaping.

Output voltage regulation and control is achieved by sensing the output voltage via a tertiary winding (pins 4&6) of transformer T1. This voltage is applied after filtering and attenuation to the Vsense pin of U1. By using this method of feedback, the need for opto-coupler feedback is eliminated reducing component count and cost.

A discretely-implemented linear regulator including Q5, Z2, and C5, fed by the tertiary winding (pins 4&6) of transformer T1, provides a constant DC bias to the control IC U1 via pin 1 (VCC) when steady-state operation is achieved. During start-up operation of U1, a transistor switch Q6 and its associated circuitry of R21, R20, C10, R22, and C5 provide the needed energy to properly start the operation of U1.

Over temperature protection is provided by a thermistor RT1, R35, R37, C46, and D15, which will provide a voltage exceeding the turn-off threshold of the SD pin of U1. Other protection includes over voltage protection provided by R14 and R34, and short-circuit protection provided by the Vsense-pin and the tertiary winding (pins 4&6) of transformer T1.

This front-end stage provided by, for example, PFC Controller 304 serves as a single-stage of power conversion that performs the task of providing a conversion of an AC-voltage to a transformer-isolated DC-voltage while at the same time regulating the input AC-current to take the shape of a sinusoid. By performing this function, high-power factor and low current-harmonic content is achieved. This single-stage of Power Factor correction and an isolated AC-DC conversion also allows for higher conversion efficiency with lower component parts count.

Figure 13:
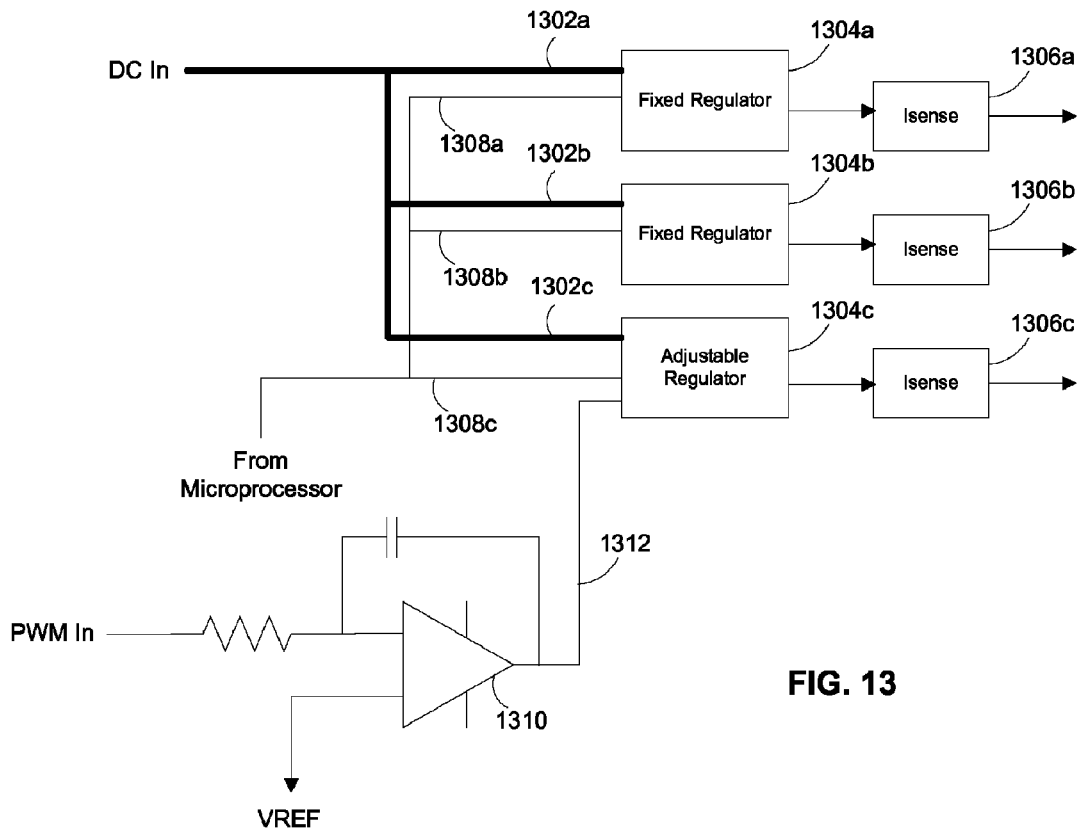
FIG. 13 is a circuit schematic illustrating regulators in accordance with some embodiments.

FIG. 13 is a circuit schematic illustrating regulators in accordance with some embodiments. As shown in FIG. 13, DC power is supplied to regulators 1304a, 1304b, and 1304c via power lines 1302a, 1302b, and 1302c, respectively. The DC power may be provided from an AC/DC converter such as PFC Controller 304, a DC-DC converter, or an external DC power source. The DC power is supplied to two fixed regulators, i.e., regulators 1304a and 1304b, which is outputted to current sense amplifiers 1306a and 1306b, respectively. Fixed regulators 1304a and 1304b can be a single dual-output 5V fixed DC-DC converter such as LTC3826 (Linear Technology 30 µA IQ, Dual, 2-Phase Synchronous Step-Down Controller). The current sense amplifiers 1306 may be, for example, LTC6102 (Linear Technology Zero Drift High Side Current Sense Amplifier). The fixed regulators 1304a and 1304b supply a fixed 5 volts. The output of current sense amplifiers 1306a and 1306b may be to output ports 204a and 204b, respectively.

DC power is also supplied to adjustable regulator 1304c, which can be a high-efficiency DC-DC converter across a wide range of loads ranging from 0.5 W to 100 W such as LTC3845 (Linear Technology High Voltage Synchronous Current Mode Step-Down Controller with Adjustable Operating Frequency). The output voltage of adjustable regulator 1304c is adjustable (e.g., between 5V to 19V) using control line 1312. Operational amplifier ("op-amp") 1310 is driven by a pulse width modulated (PWM) signal, which is controlled by, for example, microprocessor 306 of power adapter 106. The duty cycle of the PWM input at op-amp 1310 controls the output of adjustable regulator 1304c via control line 1312. The output of adjustable regulator 1304c is to current sense amplifier 1306c, which is outputted to, for example, output port 204c. Accordingly, the output current at each output port 204 is measured using the current sense amplifiers 1306. In addition, the output voltage at each port could be measured using a voltage divider circuit (not shown).

In some embodiments, in order to conserve energy, the output of regulators 1304a, 1304b, and 1304c may be disabled by ENABLE/DISABLE lines 1308a, 1308b, and 1308c, respectively. For example, microprocessor 306 can be configured to send ENABLE and DISABLE signals to regulators 1304 via ENABLE/DISABLE lines 1308.

Figure 14:
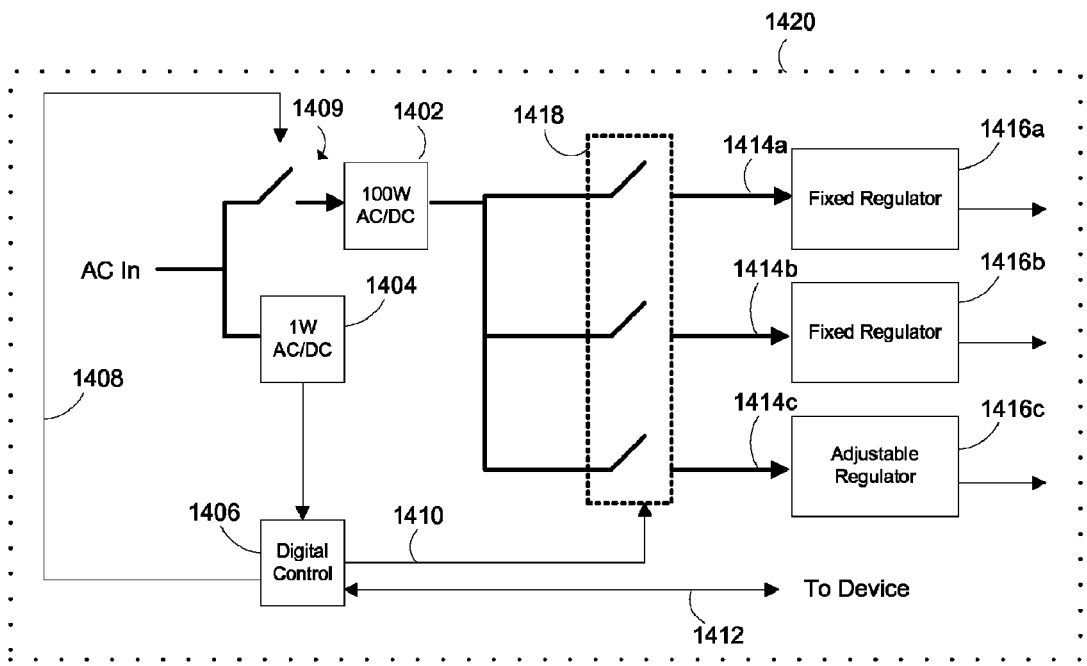
FIG. 14 is a schematic diagram illustrating a power adapter including AC/DC converters and regulators in accordance with some embodiments.

FIG. 14 is a schematic diagram illustrating a power adapter including AC/DC converters and regulators in accordance with some embodiments. As shown in FIG. 14, AC power is supplied to AC/DC converters 1402 and 1404. The AC power may be received from a source external to power adapter 1420. AC/DC converter 1404 is a low power converter that can be used to power digital control 1406. Digital control 1406 can be used to control the input switch 1409 and switches 1418, and to communicate with an attached device (not shown) via signal line 1412. Digital control 1406 may be similar to digital logic 608 or microprocessor 306, which are described above. The primary AC/DC converter 1402 is used to provide DC power to regulators 1416a, 1416b, and 1416c via power lines 1414a, 1414b, and 1414c, respectively. The output of regulators 1416 may be, for example, output ports 204. Switches 1418 may operate similarly to switches 320 described above with respect to FIG. 3. As described above with respect to power adapter 106, power adapter 1420 may operate in a standby mode that includes a no-load mode. In no-load mode when there are no devices attached to power adapter 1420, input switch 1409 may be opened to disconnect primary AC/DC converter 1402 from receiving AC power. In this situation, only AC/DC converter 1404 would be receiving AC power. AC/DC converter 1404 has significantly lower power dissipation than AC/DC converter 1402. Accordingly, in no-load mode, power adapter 1420 may be able to conserve a significant amount of energy.

In some embodiments, power adapter 106, 602, 636, or 1420 (reference herein to "power adapter 106" shall be assumed to include power adapter 602, 636, and 1420) may be further configured to communicate with a computer network such as the Internet. When connected to a computer network, power adapter 106 may be able to retrieve data or software or firmware updates for power adapter 106, any devices 102 connected to power adapter 106, or any connected legacy device 104 or 630. The user interface of power adapter 106 may also be accessible via a web server connected to the internet, thereby allowing a user to view information that would normally be displayed on, for example, display 208. In other words, a user could interact with power adapter 106 by viewing information about power adapter 106 and the connected devices 102 on a computer connected to the internet. In addition, the user could enter information and/or program power adapter 106 and the attached devices 102 through a web server by using a computer connected to the internet. In some embodiments, power adapter 106 emails to the user information that would normally be displayed on, for example, display 208. Furthermore, power adapter 106 may be a conduit for access to the computer network or the Internet for devices 102 or legacy adapter 104 or 630. This access to the computer network or Internet may be provided by way of communication lines 317, signal lines 616, or one or more separate network communication lines.

In some embodiments, a central power management unit (not shown) could have control over multiple power adapters 106 connected to the central power management unit over a computer network. Techniques such as Wake-On-LAN (WOL) could be employed to power on one or more of the connected power adapters 106. For example, in a corporation where such adapters are used, the Information Technology ("IT") department could save power by directing all power adapters 106 to standby mode. When a group of laptops (not shown) utilizing adapters 106 need to be upgraded in software at off peak hours, the IT department can easily awaken the power adapters 106 using WOL and upgrade the software on the laptops.

In some embodiments, power adapter 106 may be programmed via a flash drive or USB connection to a computer. This programming may include operating power adapter 106, 602, 636 or updating the firmware for power adapter 106, any devices 102 connected to power adapter 106, or any connected legacy device 104 or 630. For example, the user could enter information and/or program power adapter 106 and the attached devices 102 through the computer connected via the USB connection.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A power adapter to provide power to a device, comprising:
    an input port configured to receive power from a power source;
    a regulator configured to convert the received power from the power source;
    an output port configured to deliver power from the regulator to the device; and
    a programmable microprocessor configured to communicate digitally with a communication module associated with the device to determine power requirements of the device, the power requirements of the device being determined based on power adapter-maintained information stored in a memory associated with the microprocessor and device information communicated to the programmable microprocessor from the device via the communication module, wherein the regulator is configured to convert the power from the power source in accordance with the determined power requirements of the device, and wherein the power adaptor communicates digitally with the device using a packet layer protocol via a packet consisting of a 1 byte transmission start segment, a 4 byte vendor/manufacturer identifier segment, a 1 byte message type segment, a payload segment, a 2 byte checksum segment and a 1 byte transmission end segment.

2. The power adapter according to claim 1, further comprising a switch coupled between the input port and the regulator that is controlled by the programmable microprocessor.

3. The power adapter according to claim 1, wherein the device is a portable legacy device and the power adapter-maintained information includes information of at least one associated legacy device.

4. The power adapter according to claim 1, wherein the power adapter is configurable to delay delivery of power to the device until an off-peak time.

5. The power adapter according to claim 1, wherein the device is configured to operate in one of a plurality of operating modes and the regulator converts the power from the power source in accordance with the determined power requirements of the device, the power adapter-maintained information, and the operating mode of the device.

6. The power adapter according to claim 5, wherein the plurality of operating modes includes standby mode, charging mode, priority charging mode, and fully operational mode.

7. The power adapter according to claim 1, wherein the determined power requirements include at least a voltage requirement and a current requirement, and wherein the at least a voltage requirement includes at least one from a group consisting of a nominal voltage, a negative tolerance, and a positive tolerance.

8. The power adapter according to claim 1, further comprising a user interface, wherein the user interface includes a display, an input device for providing entry of user input, and a control menu with one or more control functions.

9. The power adapter according to claim 1, further comprising:
    a power signal line to deliver power from the regulator to the output port;
    a modulator/demodulator module coupled to the programmable microprocessor and the power signal line to send and receive the digital communication of the programmable microprocessor.

10. The power adapter according to claim 1, wherein the programmable microprocessor is configured to program the regulator to deliver a predefined amount of power to the communication module associated with the device when the device is connected to the output port to allow the communication module associated with the device to communicate with the power adapter.

11. The power adapter according to claim 1, wherein the packet layer protocol includes at least four message types, and the at least four messages types include at least one of a flow control message type and a power statement message type.

12. The power adapter according to claim 1, wherein the payload segment is encrypted.

13. The power adapter according to claim 1, wherein the payload segment includes proprietary information.

14. The power adapter according to claim 1, wherein communicating digitally includes communicating in accordance with a packet layer protocol encapsulated by a Universal Serial Bus protocol.

15. The power adapter according to claim 1, wherein the programmable microprocessor receives a digital communication from the device, which includes a battery, the digital communication including one or more of the following device information: device identification information, power requirement information, proprietary information, operating mode, battery identification information, and battery condition information.

16. The power adapter according to claim 1, wherein the device information includes a record of the number of times a battery has been charged or a total amount of time the battery has been charged based on the battery identification information, and the power adapter-maintained information includes an estimate of the remaining life of the battery based on the record.

17. The power adapter according to claim 15, further comprising:
    a user interface to alert a user when the battery needs replacement based at least in part on one or more of the battery identification information and the battery condition information.

18. The power adapter according to claim 1, wherein the programmable microprocessor receives, via the communication module, a digital communication from the device, which includes a battery, the digital communication including battery condition information, and the battery condition information includes one or more of: number of times the battery has been charged, amount of time the battery has held a charge, length of time since last charge, and temperature of the battery.

19. The power adapter according to claim 18, further comprising:
    a display to present one or more of: the number of times the battery has been charged, the amount of time the battery has held a charge, the length of time since last charge, and the temperature of the battery.

20. The power adapter according to claim 1, wherein the programmable microprocessor includes a power control module configured to generate a power control signal, in response to the determined power requirements by the programmable microprocessor, to control the power output of the regulator.

21. The power adapter according to claim 1, wherein the programmable microprocessor is further configured to update the power adapter-maintained information in response to the received device information.

22. The power adapter according to claim 1, wherein the programmable microprocessor includes a temperature module configured to receive temperature information from a temperature sensor in the device or a temperature sensor in the power adapter, and the power adapter-maintained information includes the temperature information from the temperature module.

23. The power adapter according to claim 1, wherein the power delivered to the device is DC.

24. The power adapter according to claim 1 further comprising a user interface, wherein the programmable microprocessor is configured to control the user interface.

25. The power adapter according to claim 24, wherein the user interface includes a display.

26. The power adapter according to claim 24, wherein the display is one of a liquid crystal display, a LED display, or an OLED display.

27. The power adapter according to claim 24, wherein the user interface is configured to display information regarding the determined power requirements of the device.

28. The power adapter according to claim 24, wherein the user interface is configured to display a state of the output port.

29. The power adapter according to claim 28, wherein the state includes a voltage level indicator.

30. The power adapter according to claim 24, wherein the user interface includes an input device for receiving user input and displaying the received user input on a display.

31. The power adapter according to claim 30, wherein the input device includes at least one of a push button and a touch screen.

32. The power adapter according to claim 1, wherein the power adapter-maintained information includes user-input data.

33. The power adapter according to claim 1, wherein the power adapter-maintained information includes adjusted device information stored in the memory or information associated with one or more statuses of the adapter.

34. The power adapter according to claim 1, wherein the device information includes predefined power profiles that include one or more of the following: a constant voltage value, a constant current value, a wattage value, an upper limit current value, and a battery type.

35. A method of adapting power to a device comprising:
receiving power from a power source at an input port;
communicating digitally with a communication module associated with the device to receive device information of the device, the digital communications comprising transmission of information using a packet-based protocol via a packet consisting of a 1 byte transmission start segment, a 4 byte vendor/manufacturer identifier segment, a 1 byte message type segment, a payload segment, a 2 byte checksum segment and a 1 byte transmission end segment;
determining the power requirements of the device based on the received device information and on power adapter-maintained information stored in a memory associated with a programmable microprocessor;
converting the power from the power source in accordance with the determined power requirements of the device; and
delivering the converted power to the device through an output port.

36. A power adapter comprising:
an input port configured to receive power from a power source;
one of more regulators configured to convert power from the power source;
a plurality of output ports configured to deliver power from the one or more regulators to a plurality of devices; and
a programmable microprocessor configured to communicate digitally with a respective communication module associated with a respective device to determine power requirements of the respective device, wherein
the power requirements of the respective device is determined based on power adapter-maintained information stored in a memory associated with the programmable microprocessor and on device information communicated to the programmable microprocessor from the respective device via the respective communication module,
one of the one or more regulators is configured to convert the power from the power source in accordance with the determined power requirements of the respective device, and
the power adaptor communicates digitally with the device using a packet layer protocol via a packet consisting of a 1 byte transmission start segment, a 4 byte vendor/manufacturer identifier segment, a 1 byte message type segment, a payload segment, a 2 byte checksum segment and a 1 byte transmission end segment.

37. The power adapter according to claim 36, further comprising a plurality of switches coupled between the input port and each of the one or more regulators, the plurality of switches being controlled by the programmable microprocessor.

38. The power adapter according to claim 37, wherein when activated, a respective switch of the plurality of switches prevents a respective regulator from being electrically connected to the input port.

39. The power adapter according to claim 36, wherein one or more of the plurality of devices is configured to operate in one of a plurality of operating modes and a respective regulator of the one or more regulators converts power from the power source in accordance with the determined power requirements of the respective device, the power adapter-maintained information, and the operating mode of the respective device.

40. The power adapter according to claim 36, wherein the programmable microprocessor receives a digital communication from one or more of the plurality of devices, where at least one of the one or more of the plurality of devices includes a rechargeable battery, the digital communication including one or more of the following device information: device identification information, power requirement information, proprietary information, operating mode, battery identification information, and battery condition information.

41. The power adapter according to claim 40, further comprising a display to present at least a part of the battery condition information to a user.

42. The power adapter according to claim 40, further comprising a user interface to alert a user when the battery needs replacement based at least in part on one or more of the battery identification information and battery condition information.

43. The power adapter according to claim 36, wherein the programmable microprocessor receives a digital communication from one or more of the plurality of devices, where at least one of the one or more of the plurality of devices includes a rechargeable battery, the digital communication including battery condition information, and the battery condition information includes one or more of: number of times the battery has been charged, amount of time the battery has held a charge, length of time since last charge, and temperature of the battery.

44. The power adapter according to claim 36, wherein the device information of the respective device includes a record of the number of times a battery has been charged or the total amount of time the battery has been charged based on battery identification information, and the power adapter-maintained information includes an estimate of the remaining life of the battery based on the record.

45. The power adapter according to claim 36, wherein a voltage and a current delivered to a respective device is independent of voltages and currents delivered to each of the other devices.

46. The power adapter according to claims 36, wherein the power adapter delivers power according to one of a plurality of charge modes when the sum of the power requirements of each of the plurality of devices exceeds a pre-defined maximum.

47. The power adapter according to claim 46, wherein the charge modes include priority charging, where the plurality of devices are charged in order of a preprogrammed preference determined by the programmable microprocessor.

48. The power adapter according to claim 46, wherein the charge modes, determined by the programmable microprocessor, include reduced power charging, where the regulator delivers a reduced power to each of the plurality of devices, which is lower than the power requirements of each of the devices.

49. The power adapter according to claim 46, wherein the charge modes include round-robin charging, where the regulator delivers power to each of the plurality of devices one device at a time.

50. The power adapter according to claim 36, further comprising:
   a plurality of power signal lines to deliver power from the one or more regulators to the plurality of output ports; and
   one or more encoder/decoder modules coupled to the programmable microprocessor and the plurality of power signal lines operable to send and receive the digital communication of the programmable microprocessor.

51. The power adapter according to claim 36, wherein the one or more regulators are configured to deliver a predefined amount of power to the communication module associated with the respective device when the respective device is connected to one of the output ports to allow the communication module associated with the respective device to communicate with the power adapter.

52. The power adapter according to claim 36, wherein the programmable microprocessor includes a power control module configured to generate one or more power control signals, in response to the determined power requirements of the respective device by the programmable microprocessor, to control the power output of the one or more regulators.

53. The power adapter according to claim 36, wherein the programmable microprocessor includes a communication module to communicate digitally with the communication module associated with each of the plurality of devices to determine the power requirements of each of the plurality of devices.

54. The power adapter according to claim 36, wherein the programmable microprocessor includes a temperature module configured to receive temperature information from a temperature sensor in the device or a temperature sensor in the power adapter, and the power adapter-maintained information includes the temperature information from the temperature module.

55. The power adapter according to claim 36, wherein the programmable microprocessor is configured to have information about the power adapter displayed on a display of the device.

56. The power adapter according to claim 36 further comprising a user interface, wherein the programmable microprocessor is configured to control the user interface.

57. The power adapter according to 56, wherein the user interface includes a display.

58. The power adapter according to claim 57, wherein the display is one of a liquid crystal display, a LED display, or an OLED display.

59. The power adapter according to claim 56, wherein the user interface is configured to provide information regarding the power requirements of one or more of the plurality of devices.

60. The power adapter according to claim 56, wherein the user interface is configured to display a state of one or more of the plurality of output ports.

61. The power adapter according to claim 60, wherein the state includes a voltage level indicator.

62. The power adapter according to claim 56, wherein the user interface includes an input device for providing entry of user input.

63. The power adapter according to claim 62, wherein the input device includes at least one of a push button and a touch screen.

64. The power adapter according to claim 36, wherein the power requirements include at least a voltage requirement and a current requirement, and wherein the at least a voltage requirement includes at least one from a group consisting of a nominal voltage, a negative tolerance, and a positive tolerance.

65. The power adapter according to claim 36, wherein at least one of the plurality of devices is a portable legacy device and the power adapter-maintained information includes information associated with the at least one portable legacy device.

66. The power adapter according to claim 36, wherein the power adapter is configurable to delay delivery of power to one or more of the plurality of devices until an off-peak time.

67. The power adapter according to claim 36, wherein the programmable microprocessor is further configured to update the power adapter-maintained information in response to the received device information from the respective device.

68. The power adapter according claim 36, further comprising a network communication module for communicating with a network.

69. The power adapter according to claim 36, wherein the packet layer protocol includes at least four message types, and the at least four message types include at least one of a flow control message type and a power statement message type.

70. The power adapter according to claim 36, wherein the payload segment is encrypted.

71. The power adapter according to claim 36, wherein the payload segment includes proprietary information.

72. The power adapter according to claim 36, wherein the power adapter-maintained information includes user-input data.

73. The power adapter according to claim 36, wherein the power adapter-maintained information includes adjusted device information stored in the memory or information associated with one or more statuses of the adapter.

74. The power adapter according to claim 36, wherein the device information includes predefined power profiles that include one or more of the following: a constant voltage value, a constant current value, a wattage value, an upper limit current value, and a battery type.

75. A method of adapting power to a plurality of devices comprising:
   receiving power from a power source at an input port;
   communicating digitally with a communication module associated with a respective device of the plurality of devices to receive device information of the respective device, the digital communications comprising transmission of information using a packet-based protocol via a packet consisting of a 1 byte transmission start segment, a 4 byte vendor/manufacturer identifier segment, a 1 byte message type segment, a payload segment, a 2 byte checksum segment and a 1 byte transmission end segment;
   determining the power requirements of the respective device based on the received device information and on power adapter-maintained information stored in a memory associated with a microprocessor;
   converting power from the power source in accordance with the determined power requirements of the respective device; and
   delivering the converted power to the respective device through one of a plurality of output ports.

76. A communication module for use with an electrical device, comprising:
   a programmable microprocessor, housed in the electrical device, configured to communicate digitally with an external power adapter to communicate device information of the electrical device to the power adapter through a port of the electrical device, and
   configured to determine power requirements of the electrical device based on power adapter-maintained information stored in a memory associated with a microprocessor and the communicated device information, the determined power requirements including at least a voltage requirement and a current requirement;
   wherein the communication module and power adaptor communicate digitally using a packet layer protocol via a packet consisting of a 1 byte transmission start segment, a 4 byte vendor/manufacturer identifier segment, a 1 byte message type segment, a payload segment, a 2 byte checksum segment and a 1 byte transmission end segment.

77. The communication module of claim 76, wherein the power port of the electrical device is configured to receive a male USB plug.

78. The communication module of claim 76, wherein the programmable microprocessor is configured to communicate digitally with a second microprocessor disposed in the power adapter to determine and communicate the power requirements of the electrical device.

79. The communication module of claim 76, wherein the electrical device includes a rechargeable battery and the programmable microprocessor communicates one or more of the following device information: device identification information, power requirements, proprietary information, operating mode, battery identification information, and battery condition information.

80. The communication module of claim 76, wherein the electrical device includes a rechargeable battery and the programmable microprocessor communicates battery identification information and battery condition information.

81. The communication module of claim 76, wherein the battery condition information includes one or more of: number of times the battery has been charged, amount of time the battery has held a charge, length of time since last charge, and temperature of the battery.

82. The communication module of claim 76, wherein the electrical device is a portable legacy device and the power adapter-maintained information includes information associated with the portable legacy device.

83. The communication module of claim 76, wherein the programmable microprocessor is further configured to update the power adapter-maintained information stored locally in response to the received device information from the electrical device.

84. The communication module of claim 76, wherein the packet layer protocol includes at least four messages types, and the at least four message types include at least one of a flow control message type and a power statement message type.

85. The communication module of claim 76, wherein the payload segment is encrypted.

86. The communication module of claim 76, wherein the payload segment includes proprietary information.

87. The communication module according to claim 76, wherein the power adapter-maintained information includes user-input data.

88. The communication module according to claim 76, wherein the power adapter-maintained information includes adjusted device information stored in the memory or information associated with one or more statuses of the adapter.

89. The communication module according to claim 76, wherein the device information includes predefined power profiles that include one or more of the following: a constant voltage value, a constant current value, a wattage value, an upper limit current value, and a battery type.

90. A method of receiving power from an external power adapter external to an electrical device, comprising:
   receiving an initial predefined voltage to facilitate communication between the external power adapter and the electrical device;
   communicating digitally with the external power adapter to communicate device information of the electrical device to the external power adapter through a power port of the electrical device, the digital communications comprising transmission of information using a packet-based protocol via a packet consisting of a 1 byte transmission start segment, a 4 byte vendor/manufacturer identifier segment, a 1 byte message type segment, a payload segment, a 2 byte checksum segment and a 1 byte transmission end segment;
   determining the power requirements of the electrical device based on the received device information and power adapter-maintained information stored in a memory associated with a microprocessor;
   receiving power supplied by the external power adapter based on the determined power requirements of the electrical device, wherein
   the power requirements include a voltage requirement and a current requirement.

* * * * *